US012106780B2

(12) United States Patent
Cai et al.

(10) Patent No.: US 12,106,780 B2
(45) Date of Patent: Oct. 1, 2024

(54) VIDEO PROCESSING METHOD AND ELECTRONIC DEVICE

(71) Applicant: Huawei Technologies Co., Ltd., Shenzhen (CN)

(72) Inventors: Xuejiang Cai, Shanghai (CN); Yanhui Yu, Shenzhen (CN); Li Cheng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 18/173,904

(22) Filed: Feb. 24, 2023

(65) Prior Publication Data

US 2023/0197115 A1  Jun. 22, 2023

Related U.S. Application Data

(63) Continuation of application No. PCT/CN2021/113153, filed on Aug. 18, 2021.

(30) Foreign Application Priority Data

Aug. 26, 2020 (CN) .......................... 202010883703.9

(51) Int. Cl.
 *G11B 27/34* (2006.01)
 *H04N 23/62* (2023.01)
 *H04N 23/667* (2023.01)
 *H04N 23/69* (2023.01)

(52) U.S. Cl.
 CPC ............. *G11B 27/34* (2013.01); *H04N 23/62* (2023.01); *H04N 23/667* (2023.01); *H04N 23/69* (2023.01)

(58) Field of Classification Search
 CPC ...... G11B 27/34; H04N 23/62; H04N 23/667; H04N 23/69; H04N 21/42203; H04N 21/43072; H04N 21/4394; H04N 21/4223; H04N 21/8547; H04N 23/60; H04N 23/631; H04N 23/632; H04N 21/4305; H04N 21/4307; H04N 21/85406; H04N 23/67
 USPC ........................................................ 386/241
 See application file for complete search history.

(56) References Cited

U.S. PATENT DOCUMENTS

| | | | | |
|---|---|---|---|---|
| 6,985,501 B2 * | 1/2006 | Suzuki | ...................... | H04L 65/80 370/252 |
| 7,295,548 B2 * | 11/2007 | Blank | ...................... | H04L 65/70 370/352 |
| 11,259,058 B2 * | 2/2022 | Goldrei | ............ | H04N 21/23418 |
| 11,340,250 B2 * | 5/2022 | Riccardi | ................. | G06F 3/033 |
| 2007/0165837 A1 * | 7/2007 | Zhong | ................... | H04M 9/082 379/406.01 |
| 2009/0060446 A1 * | 3/2009 | Holden | ............... | H04N 21/4135 386/356 |
| 2023/0297324 A1 * | 9/2023 | Yu | ....................... | H04N 21/4852 700/94 |

(Continued)

*Primary Examiner* — Helen Shibru
(74) *Attorney, Agent, or Firm* — Conley Rose, P.C.

(57) ABSTRACT

A first audio timestamp of first audio is corrected based on a first latency corresponding to the first audio, to correct a correspondence between the first audio timestamp, the first audio, and a first image. In this way, a stored correspondence between the first image and the first audio is consistent with a correspondence between a picture corresponding to the first image and a sound corresponding to the first audio, thereby implementing audio and image synchronization.

20 Claims, 17 Drawing Sheets

(56) References Cited

U.S. PATENT DOCUMENTS

2024/0031636 A1* 1/2024 Shaw ............... H04N 21/43072
2024/0152314 A1* 5/2024 Mackay ............. H04N 21/4305

* cited by examiner

Reference timeline (ms) :  0         20        40        60

Audio timestamps (ms) :    0         20        40        60

Video timestamps (ms) :    0    17        34        51

FIG. 5

Written audio timestamps (ms): 0 20 40 60 80
Recording audio timestamps (ms): 0 20 20 40 60

Audio timestamps before processing (ms): 0 20 ~~20~~ 40 60
Audio timestamps after processing (ms): 0 20 40 60

Written audio timestamps (ms) : 0   20    40    60    80

Recording audio timestamps (ms) : 0   20   60  80

FIG. 11A

Audio timestamps before processing (ms) :   0    20    60        80

Audio timestamps after processing (ms) :   0    20   40 (inserted)  60    80

FIG. 11B

VIDEO PROCESSING METHOD AND ELECTRONIC DEVICE

CROSS-REFERENCE TO RELATED APPLICATIONS

This is a continuation of International Patent Application No. PCT/CN2021/113153 filed on Aug. 18, 2021, which claims priority to Chinese Patent Application No. 202010883703.9 filed on Aug. 26, 2020. The disclosures of the aforementioned applications are hereby incorporated by reference in their entireties.

TECHNICAL FIELD

Embodiments of this disclosure relate to the video processing field, and in particular, to a video processing method and an electronic device.

BACKGROUND

With improvement of photographing technologies of a mobile phone, in a video recording process, a camera of the mobile phone may support 10× or even higher optical zoom. In addition, a processing capability of a mobile phone microphone is also improved. To be specific, the mobile phone microphone may collect sounds within a zoom range, to implement directional sound pickup.

However, in a zoom photographing scenario, especially when a photographed object is far away from the mobile phone, a phenomenon of audio-visual asynchronization occurs due to a sound propagation latency, and a larger zoom ratio indicates a more serious problem of audio-visual asynchronization.

SUMMARY

To resolve the foregoing technical problem, this disclosure provides a video processing method and an electronic device. In the method, in a video recording process, the electronic device can correct an audio timestamp based on a latency corresponding to audio, to implement synchronization between the audio and a video picture, thereby improving user experience.

According to a first aspect, a video processing method is provided. The video processing method includes: detecting a first instruction of a user; displaying a photographing interface in response to the first instruction; obtaining a first zoom ratio, and obtaining a first video corresponding to the first zoom ratio, where the first video includes first audio and a first image, the first audio corresponds to the first image, the first image includes a photographed object, the first audio is generated based on a sound emitted by a sound source, and the sound source is the photographed object, or a distance between the sound source and the photographed object is within a specified range; obtaining a first latency corresponding to the first audio, where the first latency includes a first sound propagation latency, or the first latency includes the first sound propagation latency and a specified algorithm processing latency, and the first sound propagation latency is a latency caused when the sound emitted by the sound source is transmitted from the sound source to an electronic device; determining a first audio timestamp of the first audio based on the first latency; and displaying the first image on the photographing interface, and storing the first image and a correspondence between the first audio and the first audio timestamp.

It may be understood that the foregoing execution body, namely, the electronic device, may alternatively be replaced with at least one software module, or at least one software module and at least one hardware module, for example, modules in FIG. 1A and FIG. 2.

For example, the electronic device may read, at each period trigger moment of a reading period, audio collected by a collection point, where the collection point may be integrated on a chip of the electronic device, or may be outside the chip, and the collection point may be a microphone. Correspondingly, that the electronic device obtains the first video corresponding to the first zoom ratio is that the electronic device reads, in a first reading period, audio collected by the microphone.

For example, that the first audio corresponds to the first image means that a sound corresponding to the first audio and a picture corresponding to the first image occur synchronously in a photographing scenario. A correspondence between an image frame and an audio frame shown in FIG. 7C is used as an example.

For example, the photographed object included in the first image is a moving or static person or object.

For example, in a scenario in which the photographed object and the sound source are different objects, for example, a scenario shown in FIG. 7A, the distance between the photographed object and the sound source is within the specified range. For example, the specified range may be 1 meter. To be specific, the sound source may be at any location in a circle that uses the photographed object as a center and whose radius is 1 meter.

For example, whether the first latency includes the specified algorithm processing latency depends on a value of the first zoom ratio. If the first zoom ratio is greater than a specified zoom ratio, for example, 2×, the first latency includes the first sound propagation latency and the algorithm processing latency. If the first zoom ratio is less than or equal to the specified zoom ratio, the first latency includes the first sound propagation latency. Because the sound emitted by the sound source needs a specific time to be transmitted from the sound source to the electronic device, there is a time difference between emitting the sound by the sound source and collecting the sound. Therefore, the first sound propagation latency is caused. The first sound propagation latency may be calculated by dividing a distance from the sound source to the collection point or a collection device by a propagation speed of the sound. The distance from the sound source to the collection point or the collection device may be obtained in a sensor ranging manner. Because the sound source is close to the photographed object, a distance from the photographed object to the collection point or the collection device may alternatively be approximately used.

For example, a manner in which the electronic device stores the correspondence between the first audio and the first audio timestamp may be: correspondingly writing the first audio and the first audio timestamp into a video file, where the video file may be an MP4 file.

In this way, the electronic device may determine, based on an obtained latency, an audio timestamp corresponding to audio, to correct the audio timestamp. Therefore, when a sound propagation latency exists between a time at which the electronic device obtains the audio and an actual occurrence time of a sound corresponding to the audio due to a time required by the sound emitted from a sound source to be transmitted from the sound source to the electronic device, and the algorithm processing latency is caused when the audio timestamp is processed, impact of the sound propagation latency and the algorithm processing latency on the audio timestamp can be effectively canceled, thereby reducing an error between the audio timestamp corresponding to the audio and the time (which refers to a time relative to a video recording start moment) at which the sound corresponding to the audio is actually emitted from the sound source. In this way, the stored correspondence between the first image and the first audio is consistent with a correspondence between the picture corresponding to the first image and the sound corresponding to the first audio, thereby implementing audio and image synchronization.

According to the first aspect, after the storing the first image and a correspondence between the first audio and the first audio timestamp, the method further includes: synchronously playing the first audio and the first image based on the first audio timestamp.

For example, in a video recording process, the electronic device may further obtain a first image timestamp corresponding to the first image. In a process of playing the first video, the electronic device may align the first image timestamp with the first audio timestamp, and play the first image corresponding to the first image timestamp and the audio corresponding to the first audio timestamp.

For example, a moment at which the first video is played may be any moment after video recording is completed. For example, after video recording is completed, the electronic device detects a play instruction of the user and plays the first video, or the electronic device detects a recording stop instruction of the user, and stops video recording and plays the first video. It should be noted that the electronic device that plays the first video may alternatively be another electronic device.

In this way, an audio timestamp that corresponds to each piece of audio and that is corrected based on a latency is consistent with an actual occurrence time of a sound corresponding to the audio, or is consistent with an occurrence time of an image corresponding to the audio. Therefore, in the process of playing the first video, the first audio and the first image are played synchronously, that is, audio and image (namely, a video picture) synchronization is implemented.

According to the first aspect or any implementation of the first aspect, the obtaining a first latency corresponding to the first audio includes: obtaining a first imaging distance corresponding to the first zoom ratio based on the first zoom ratio and a correspondence between a zoom ratio and an imaging distance; and calculating the first sound propagation latency based on the following formula: the first sound propagation latency=d1/c, where d1 is the first imaging distance, and c is a propagation speed of the sound in a photographing medium.

The determining a first audio timestamp of the first audio based on the latency corresponding to the first audio includes: calculating the first audio timestamp based on the following formula: the first audio timestamp=N1×l—a latency 1, where the latency 1 is the first latency; l is duration of the reading period; the reading period is a period of periodically reading, from a beginning of the video recording, the audio collected by the collection point; N1 is a reading period corresponding to the first audio; and N1 is an integer greater than or equal to 1.

For example, one or more zoom ratios and an imaging distance corresponding to each zoom ratio are specified in the electronic device. The electronic device may match the first zoom ratio with the one or more specified zoom ratios, to obtain the corresponding first imaging distance.

For example, the first imaging distance may be greater than an actual distance between the sound source and the electronic device, may be less than the actual distance, or may be equal to the actual distance.

For example, the electronic device periodically reads audio from the collection point, to obtain one or more pieces of audio whose duration is equal to the reading period, where the first audio belongs to the one or more pieces of audio. For example, the video recording start moment may be denoted as a reading period n, and each subsequent reading period is denoted as N+n.

For example, c may be a propagation speed of the sound in the air. For example, if photographing is performed underwater, c is a propagation speed of the sound in the water.

In this way, the electronic device may obtain, based on an imaging distance corresponding to a zoom ratio, a latency corresponding to the zoom ratio, and may correct, based on the obtained latency, an audio timestamp corresponding to audio obtained at the zoom ratio, to implement audio and image synchronization.

According to the first aspect or any implementation of the first aspect, after the storing the first image and a correspondence between the first audio and the first audio timestamp, the method further includes: detecting a second instruction of the user; obtaining a second zoom ratio based on the second instruction, and obtaining a second video corresponding to the second zoom ratio, where the second video includes second audio and a second image, the second image includes another photographed object, the second audio is generated based on a sound emitted by another sound source, the other sound source is the other photographed object, or a distance between the other sound source and the other photographed object is within the specified range, and the second zoom ratio is different from the first zoom ratio; obtaining a second latency corresponding to the second audio, where the second latency includes a second sound propagation latency, or the second latency includes the second sound propagation latency and the algorithm processing latency, and the second sound propagation latency is a latency caused when the sound emitted by the other sound source is transmitted from the other sound source to the electronic device; and determining a second audio timestamp of the second audio based on the second latency.

For example, in the video recording process, the electronic device may adjust the zoom ratio based on an instruction of the user. For example, an adjusted zoom ratio (namely, the second zoom ratio) may be greater than or less than a zoom ratio at a previous moment, for example, the first zoom ratio. The electronic device may obtain the second video based on the second zoom ratio.

For example, the other photographed object and the foregoing photographed object in the first aspect may be a same object, or may be different objects. The other sound source and the foregoing sound source in the first aspect may be a same sound source, or may be different sound sources.

For example, because a change of the zoom ratio causes a change of a corresponding latency, the second image and the second audio that are obtained by the electronic device may not correspond to each other. In other words, a sound corresponding to the second audio and a picture corresponding to the second image do not occur synchronously.

In this way, the electronic device may correct, based on latencies corresponding to audio obtained at different zoom ratios, audio timestamps corresponding to the audio obtained at the zoom ratios, so that each piece of audio stored in the video recording process corresponds to a corresponding image.

According to the first aspect or any implementation of the first aspect, the obtaining a second latency corresponding to the second audio includes: obtaining a second imaging distance corresponding to the second zoom ratio based on the second zoom ratio and the correspondence between a zoom ratio and an imaging distance; and calculating the second sound propagation latency based on the following formula: the second sound propagation latency=—d2/c, where d2 is the second imaging distance.

In this way, the electronic device may obtain, based on imaging distances corresponding to different zoom ratios, latencies corresponding to audio obtained at the different zoom ratios.

According to the first aspect or any implementation of the first aspect, the determining a second audio timestamp of the second audio based on the second latency includes: calculating the second audio timestamp based on the following formula: the second audio timestamp=N2×l–a latency 2, where the latency 2 is the second latency, N2 is a reading period corresponding to the second audio, N2 and N1 are adjacent periods, and N2 is greater than N1.

For example, N2 and N1 are adjacent periods, and N2 is greater than N1. In other words, the reading period corresponding to the first audio is a previous period adjacent to the reading period corresponding to the second audio.

In this way, the electronic device may obtain, based on imaging distances corresponding to different zoom ratios, latencies corresponding to audio obtained at the different zoom ratios, to correct, based on the latencies corresponding to the audio, audio timestamps corresponding to the audio, so as to implement audio and image synchronization.

According to the first aspect or any implementation of the first aspect, after the determining a second audio timestamp of the second audio, the method includes: obtaining a difference between the second audio timestamp and the first audio timestamp based on the following formula: the difference=the second audio timestamp–the first audio timestamp; and if the difference is greater than 0 and less than 2l, displaying the second image on the photographing interface, and storing the second image and a correspondence between the second audio and the second audio timestamp.

For example, 2l may represent twice the reading period duration, or may represent twice an audio frame length, where the audio frame length is equal to the reading period duration.

In this way, the electronic device may determine, based on a difference between two adjacent audio timestamps, whether an audio timestamp jitter problem occurs in an obtained audio timestamp (namely, an audio timestamp corresponding to audio obtained in a current reading period). If the difference between the two adjacent audio timestamps is greater than 0 and less than 2l, it is determined that no audio timestamp jitter problem occurs, and the obtained audio and audio timestamp are stored in correspondence.

According to the first aspect or any implementation of the first aspect, if the difference is less than 0, the second image is displayed on the photographing interface, the second image is stored, and the second audio and the second audio timestamp are discarded.

For example, after the second audio and the second audio timestamp are discarded, the second image in the second video corresponds to audio (for example, third audio) obtained in a next reading period. In other words, in a video playing process, the second image and the third audio are played synchronously.

In this way, when an audio timestamp jitter problem is caused by an increase of the zoom ratio, the electronic device may resolve the audio timestamp jitter problem by discarding the second audio and the second audio timestamp.

According to the first aspect or any implementation of the first aspect, after the second image is stored, and the second audio and the second audio timestamp are discarded, the method further includes: synchronously playing the third audio and the second image based on a third audio timestamp, where the third audio timestamp corresponds to the third audio, and the third audio is obtained in the next reading period of the reading period corresponding to the second audio.

For example, the electronic device may play a stored video, that is, display each corresponding image based on an image timestamp corresponding to the image, and play each piece of corresponding audio based on an audio timestamp corresponding to the audio.

For example, after the second audio and the second timestamp are discarded, the stored second image corresponds to the third audio. In other words, the original correspondence between the second image and the second audio is updated to a correspondence between the second image and the third audio, that is, a picture corresponding to the second image and a sound corresponding to the third audio occur synchronously.

In this way, in a manner of discarding a jittered audio timestamp and corresponding audio, an audio timestamp jitter problem caused by a decrease of the zoom ratio is suppressed, to implement audio and image synchronization in the playing process.

According to the first aspect or any implementation of the first aspect, if the difference is greater than or equal to 2l, the second image is displayed, and the second image, the correspondence between the second audio and the second audio timestamp, and a correspondence between inserted audio and an inserted audio timestamp are stored, where the inserted audio is obtained based on the second audio. The inserted audio timestamp is obtained based on the following formula:

$$\text{the inserted audio timestamp} = N2 \times l - \frac{d1 + d2}{2c}, \text{ or}$$

$$\text{the inserted audio timestamp} = N2 \times l - \frac{d1 + d2}{2c} - p,$$

where p is the algorithm processing latency.

For example, an inserted audio frame may be obtained after fade-in and fade-out processing is performed on the second audio.

In this way, when the audio timestamp jitter problem is caused by the decrease of the zoom ratio, the electronic device may resolve the audio timestamp jitter problem by inserting the inserted audio and inserting the inserted audio timestamp between the first audio timestamp and the second audio timestamp.

According to the first aspect or any implementation of the first aspect, after the second image, the correspondence between the second audio and the second audio timestamp, and the correspondence between the inserted audio and the inserted audio timestamp are stored, the method further includes: synchronously playing the inserted audio and the second image based on the inserted audio timestamp.

For example, after the inserted audio is inserted, the stored second image corresponds to the inserted audio. For example, the second audio may correspond to a third image. In other words, the sound corresponding to the second audio and a picture corresponding to the third image occur synchronously.

In this way, in a manner of inserting the inserted audio and inserting the inserted audio timestamp between the first audio timestamp and the second audio timestamp, the audio timestamp jitter problem caused by the increase of the zoom ratio is suppressed, to implement audio and image synchronization in the playing process.

According to the first aspect or any implementation of the first aspect, the determining a second audio timestamp of the second audio based on the second latency includes: if the second sound propagation latency is less than the first sound propagation latency, obtaining a first latency difference based on the following formula: the first latency difference=the first sound propagation latency−the second sound propagation latency, where the reading period of the first audio is the previous period adjacent to the reading period of the second audio; if the second sound propagation latency is greater than the first sound propagation latency, obtaining a second latency difference based on the following formula: the second latency difference=the second sound propagation latency−the first sound propagation latency; and if the first latency difference is greater than 0 and less than 1, or the second latency difference is greater than 0 and less than 1, calculating the second audio timestamp based on the following formula: the second audio timestamp=N2×l−a latency 2, where the latency 2 is the second latency, N2 is the reading period corresponding to the second audio, N2 and N1 are adjacent periods, and N2 is greater than N1.

The second image is displayed on the photographing interface, and the second image and the correspondence between the second audio and the second audio timestamp are stored.

According to the first aspect or any implementation of the first aspect, if the first latency difference is greater than or equal to 1, the second image is displayed on the photographing interface, the second image is stored, and the second audio is discarded.

According to the first aspect or any implementation of the first aspect, after the second image is stored, and the second audio is discarded, the method further includes: synchronously playing the third audio and the second image based on a third audio timestamp, where the third audio timestamp corresponds to the third audio, and the third audio is obtained in the next reading period of the reading period corresponding to the second audio.

According to the first aspect or any implementation of the first aspect, if the second latency difference is greater than or equal to 1, the second image is displayed, and the second image, the correspondence between the second audio and the second audio timestamp, and a correspondence between inserted audio and an inserted audio timestamp are stored, where the inserted audio is obtained based on the second audio.

The second audio timestamp is calculated based on the following formula: the second audio timestamp=N2×l−the latency 2, where the latency 2 is the second latency, N2 is the reading period corresponding to the second audio, N2 and N1 are adjacent periods, and N2 is greater than N1.

The inserted audio timestamp is obtained based on the following formula:

$$\text{the inserted audio timestamp} = N2 \times l - \frac{d1 + d2}{2c}, \text{ or}$$

$$\text{the inserted audio timestamp} = N2 \times l - \frac{d1 + d2}{2c} - p,$$

where p is the algorithm processing latency.

According to the first aspect or any implementation of the first aspect, after the second image, the correspondence between the second audio and the second audio timestamp, and the correspondence between the inserted audio and the inserted audio timestamp are stored, the method further includes: synchronously playing the inserted audio and the second image based on the inserted audio timestamp.

According to the first aspect or any implementation of the first aspect, the obtaining a first latency corresponding to the first audio includes: when the first zoom ratio is greater than a specified zoom ratio, obtaining the first latency corresponding to the first audio.

For example, in the video recording process, the electronic device may detect whether the obtained zoom ratio is greater than the specified zoom ratio, and obtain the first latency corresponding to the first audio after the zoom ratio is greater than the specified zoom ratio. For example, the specified zoom ratio may be 2×, 2.5×, or the like. In other words, in a scenario in which the zoom ratio is less than the specified zoom ratio, the solution of determining an audio timestamp based on a latency in this disclosure is not triggered. In this way, processing pressure of the device can be effectively reduced, thereby reducing system resources.

According to the first aspect or any implementation of the first aspect, the obtaining a first zoom ratio includes: reading a stored zoom ratio that is obtained last time before previous video recording ends; or detecting a zoom instruction of the user, and obtaining the first zoom ratio in response to the zoom instruction; or detecting a mode setting instruction of the user, determining a first zoom mode in response to the mode setting instruction, and obtaining the first zoom ratio corresponding to the first zoom mode based on a correspondence between a zoom mode and a zoom ratio.

For example, the first zoom ratio may be set by the user in a process in which the user displays a preview image on the photographing interface. For example, the first zoom ratio may alternatively be set by the user in a zoom ratio adjustment option on the photographing interface of the electronic device at any moment in the video recording process. For example, the first zoom ratio may alternatively be a zoom ratio obtained last time in a previous video recording process, and the zoom ratio is still used in the current video recording process. In other words, the electronic device may obtain the first zoom ratio at the video recording start moment. For example, the first zoom ratio may alternatively be a zoom ratio corresponding to a large focal length mode, for example, a distant photographing mode, set by the user in an image previewing or video recording process. The zoom ratio corresponding to the mode is 5×.

It should be noted that, in a process of displaying the preview image and displaying the image on the photographing interface, the electronic device may collect and display only the image, but does not collect audio.

In this way, in the video recording process, the electronic device may start to obtain the zoom ratio, that is, trigger the video processing method in this embodiment of this disclosure, based on a received user instruction.

According to the first aspect or any implementation of the first aspect, the algorithm processing latency is a specified fixed latency.

In this way, when correcting the audio timestamp, the electronic device may obtain, based on the algorithm processing latency configured in the electronic device (for example, a memory of the electronic device), the latency corresponding to the audio.

According to a second aspect, an embodiment of this disclosure provides an electronic device. The electronic device includes one or more processors, a memory, and one or more computer programs. The one or more computer programs are stored in the memory. When the computer programs are executed by the one or more processors, the electronic device is enabled to perform the following steps: detecting a first instruction of a user; displaying a photographing interface in response to the first instruction; obtaining a first zoom ratio, and obtaining a first video corresponding to the first zoom ratio, where the first video includes first audio and a first image, the first audio corresponds to the first image, the first image includes a photographed object, the first audio is generated based on a sound emitted by a sound source, and the sound source is the photographed object, or a distance between the sound source and the photographed object is within a specified range; obtaining a first latency corresponding to the first audio, where the first latency includes a first sound propagation latency, or the first latency includes the first sound propagation latency and a specified algorithm processing latency, and the first sound propagation latency is a latency caused when the sound emitted by the sound source is transmitted from the sound source to the electronic device; determining a first audio timestamp of the first audio based on the first latency; displaying the first image on the photographing interface, and storing the first image and a correspondence between the first audio and the first audio timestamp.

According to the second aspect, when the computer programs are executed by the one or more processors, the electronic device is enabled to perform the following step: synchronously playing the first audio and the first image based on the first audio timestamp.

According to the second aspect or any implementation of the second aspect, when the computer programs are executed by the one or more processors, the electronic device is enabled to perform the following steps: obtaining a first imaging distance corresponding to the first zoom ratio based on the first zoom ratio and a correspondence between a zoom ratio and an imaging distance; and calculating the first sound propagation latency based on the following formula:

$$\text{the first sound propagation latency} = \frac{d1}{c},$$

where d1 is the first imaging distance, and c is a propagation speed of the sound in a photographing medium.

The electronic device further performs the following step: calculating the first audio timestamp based on the following formula: the first audio timestamp=N1×l−a latency 1, where the latency 1 is the first latency; l is duration of a reading period; the reading period is a period of periodically reading, from a video recording start moment, audio collected by a collection point; N1 is a reading period corresponding to the first audio; and N1 is an integer greater than or equal to 1.

According to the second aspect or any implementation of the second aspect, when the computer programs are executed by the one or more processors, the electronic device is enabled to perform the following steps: detecting a second instruction of the user; obtaining a second zoom ratio based on the second instruction, and obtaining a second video corresponding to the second zoom ratio, where the second video includes second audio and a second image, the second image includes another photographed object, the second audio is generated based on a sound emitted by another sound source, the other sound source is the other photographed object, or a distance between the other sound source and the other photographed object is within the specified range, and the second zoom ratio is different from the first zoom ratio; obtaining a second latency corresponding to the second audio, where the second latency includes a second sound propagation latency, or the second latency includes the second sound propagation latency and the algorithm processing latency, and the second sound propagation latency is a latency caused when the sound emitted by the other sound source is transmitted from the other sound source to the electronic device; and determining a second audio timestamp of the second audio based on the second latency.

According to the second aspect or any implementation of the second aspect, when the computer programs are executed by the one or more processors, the electronic device is enabled to perform the following steps: obtaining a second imaging distance corresponding to the second zoom ratio based on the second zoom ratio and the correspondence between a zoom ratio and an imaging distance; and calculating the second sound propagation latency based on the following formula:

$$\text{the second sound propagation latency} = \frac{d2}{c},$$

where d2 is the second imaging distance.

According to the second aspect or any implementation of the second aspect, when the computer programs are executed by the one or more processors, the electronic device is enabled to perform the following step: calculating the second audio timestamp based on the following formula: the second audio timestamp=N2×l−a latency 2, where the latency 2 is the second latency, N2 is a reading period corresponding to the second audio, N2 and N1 are adjacent periods, and N2 is greater than N1.

According to the second aspect or any implementation of the second aspect, when the computer programs are executed by the one or more processors, the electronic device is enabled to perform the following steps: obtaining a difference between the second audio timestamp and the first audio timestamp based on the following formula: the difference=the second audio timestamp−the first audio timestamp; and if the difference is greater than 0 and less than 2l, displaying the second image on the photographing interface, and storing the second image and a correspondence between the second audio and the second audio timestamp.

According to the second aspect or any implementation of the second aspect, when the computer programs are executed by the one or more processors, the electronic device is enabled to perform the following steps: if the difference is less than 0, displaying the second image on the photographing interface, storing the second image, and discarding the second audio and the second audio timestamp.

According to the second aspect or any implementation of the second aspect, when the computer programs are executed by the one or more processors, the electronic device is enabled to perform the following steps: synchronously playing third audio and the second image based on a third audio timestamp, where the third audio timestamp corresponds to the third audio, and the third audio is obtained in a next reading period of the reading period corresponding to the second audio.

According to the second aspect or any implementation of the second aspect, when the computer programs are executed by the one or more processors, the electronic device is enabled to perform the following steps: if the difference is greater than or equal to 2l, displaying the second image, and storing the second image, the correspondence between the second audio and the second audio timestamp, and a correspondence between inserted audio and an inserted audio timestamp, where the inserted audio is obtained based on the second audio.

The inserted audio timestamp is obtained based on the following formula:

$$\text{the inserted audio timestamp} = N2 \times l - \frac{d1+d2}{2c}, \text{ or}$$

$$\text{the inserted audio timestamp} = N2 \times l - \frac{d1+d2}{2c} - p,$$

where p is the algorithm processing latency.

According to the second aspect or any implementation of the second aspect, when the computer programs are executed by the one or more processors, the electronic device is enabled to perform the following step: synchronously playing the inserted audio and the second image based on the inserted audio timestamp.

According to the second aspect or any implementation of the second aspect, when the computer programs are executed by the one or more processors, the electronic device is enabled to perform the following steps: if the second sound propagation latency is less than the first sound propagation latency, obtaining a first latency difference based on the following formula: the first latency difference=the first sound propagation latency−the second sound propagation latency, where the reading period of the first audio is a previous period adjacent to the reading period of the second audio; if the second sound propagation latency is greater than the first sound propagation latency, obtaining a second latency difference based on the following formula: the second latency difference=the second sound propagation latency−the first sound propagation latency; and if the first latency difference is greater than 0 and less than 1, or the second latency difference is greater than 0 and less than 1, calculating the second audio timestamp based on the following formula: the second audio timestamp=N2×l−the latency 2, where the latency 2 is the second latency, N2 is the reading period corresponding to the second audio, N2 and N1 are adjacent periods, and N2 is greater than N1.

The second image is displayed on the photographing interface, and the second image and the correspondence between the second audio and the second audio timestamp are stored.

According to the second aspect or any implementation of the second aspect, when the computer programs are executed by the one or more processors, the electronic device is enabled to perform the following steps: if the first latency difference is greater than or equal to 1, displaying the second image on the photographing interface, storing the second image, and discarding the second audio.

According to the second aspect or any implementation of the second aspect, when the computer programs are executed by the one or more processors, the electronic device is enabled to perform the following steps: synchronously playing third audio and the second image based on a third audio timestamp, where the third audio timestamp corresponds to the third audio, and the third audio is obtained in a next reading period of the reading period corresponding to the second audio.

According to the second aspect or any implementation of the second aspect, when the computer programs are executed by the one or more processors, the electronic device is enabled to perform the following steps: if the second latency difference is greater than or equal to 1, displaying the second image, and storing the second image, the correspondence between the second audio and the second audio timestamp, and a correspondence between inserted audio and an inserted audio timestamp, where the inserted audio is obtained based on the second audio.

The second audio timestamp is calculated based on the following formula: the second audio timestamp=N2×l−the latency 2, where the latency 2 is the second latency, N2 is the reading period corresponding to the second audio, N2 and N1 are adjacent periods, and N2 is greater than N1.

The inserted audio timestamp is obtained based on the following formula:

$$\text{the inserted audio timestamp} = N2 \times l - \frac{d1+d2}{2c}, \text{ or}$$

$$\text{the inserted audio timestamp} = N2 \times l - \frac{d1+d2}{2c} - p,$$

where p is the algorithm processing latency.

According to the second aspect or any implementation of the second aspect, when the computer programs are executed by the one or more processors, the electronic device is enabled to perform the following step: synchronously playing the inserted audio and the second image based on the inserted audio timestamp.

According to the second aspect or any implementation of the second aspect, when the computer programs are executed by the one or more processors, the electronic device is enabled to perform the following step: when the first zoom ratio is greater than a specified zoom ratio, obtaining a first latency corresponding to the first audio.

According to the second aspect or any implementation of the second aspect, when the computer programs are executed by the one or more processors, the electronic device is enabled to perform the following steps: reading a stored zoom ratio that is obtained last time before previous video recording ends; or detecting a zoom instruction of the user, and obtaining the first zoom ratio in response to the zoom instruction; or detecting a mode setting instruction of the user, determining a first zoom mode in response to the mode setting instruction, and obtaining the first zoom ratio corresponding to the first zoom mode based on a correspondence between a zoom mode and a zoom ratio.

The second aspect and any implementation of the second aspect respectively correspond to the first aspect and any implementation of the first aspect. For technical effects corresponding to the second aspect and any implementation of the second aspect, refer to the technical effects corresponding to the first aspect and any implementation of the first aspect. Details are not described herein again.

According to a third aspect, a computer-readable storage medium is provided. The medium includes a computer program. When the computer program is run on an electronic device, the electronic device is enabled to perform the video processing method according to any one of the first aspect and the implementations of the first aspect.

The third aspect and any implementation of the third aspect respectively correspond to the first aspect and any implementation of the first aspect. For technical effects corresponding to the third aspect and any implementation of the third aspect, refer to the technical effects corresponding to the first aspect and any implementation of the first aspect. Details are not described herein again.

According to a fourth aspect, a chip is provided. The chip includes at least one processing circuit and an interface. The processing circuit may perform the video processing method according to any one of the first aspect and the implementations of the first aspect.

The fourth aspect and any implementation of the fourth aspect respectively correspond to the first aspect and any implementation of the first aspect. For technical effects corresponding to the fourth aspect and any implementation of the fourth aspect, refer to the technical effects corresponding to the first aspect and any implementation of the first aspect. Details are not described herein again.

BRIEF DESCRIPTION OF DRAWINGS

FIG. 5 is an example of a schematic diagram of a process of playing audio and an image based on a timestamp.

FIG. 11A is an example of a schematic diagram of comparison of audio timestamps in a scenario in which a zoom ratio decreases.

FIG. 11B is an example of a schematic diagram of comparison of audio timestamps in a scenario in which a zoom ratio decreases.

DESCRIPTION OF EMBODIMENTS

The term "and/or" in this specification describes only an association relationship for describing associated objects and represents that three relationships may exist. For example, A and/or B may represent the following three cases: only A exists, both A and B exist, and only B exists.

In the specification and claims in embodiments of this disclosure, the terms "first", "second", and so on are intended to distinguish between different objects but do not indicate a particular order of the objects. For example, a first target object, a second target object, and the like are used to distinguish between different target objects, but are not used to describe a particular order of the target objects.

In embodiments of this disclosure, the word "example" or "for example" is used to represent giving an example, an illustration, or a description. Any embodiment or design scheme described as an "example" or "for example" in embodiments of this disclosure should not be explained as being more preferred or having more advantages than another embodiment or design scheme. Exactly, use of the word "example", "for example", or the like is intended to present a related concept in a specific manner.

In the descriptions of embodiments of this disclosure, unless otherwise stated, "a plurality of" means two or more than two. For example, a plurality of processing units refers to two or more processing units, and a plurality of systems refer to two or more systems.

A video processing method provided in embodiments of this disclosure may be applied to an electronic device, and the electronic device may also be referred to as a terminal, a terminal device, or the like. For example, the electronic device may be a mobile phone, a tablet computer, a wearable device, a vehicle-mounted device, an augmented reality (AR)/virtual reality (VR) device, a notebook computer, an ultra-mobile personal computer (UMPC), a netbook, a personal digital assistant (PDA), or a dedicated camera (for example, a single-lens reflex camera or a card camera). A specific type of the electronic device is not limited in embodiments of this disclosure.

Figure 1A:
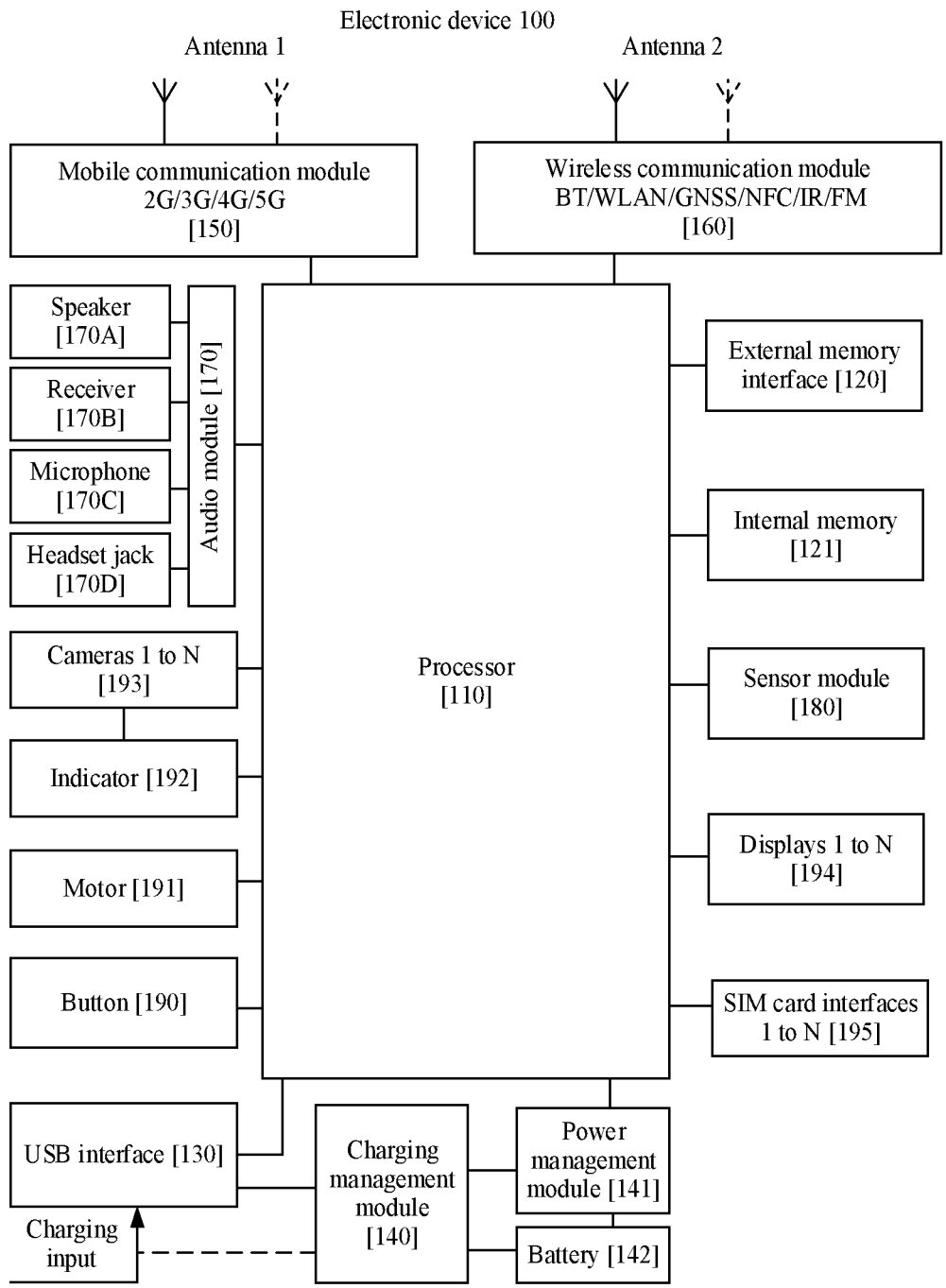
FIG. 1A is an example of a schematic diagram of a structure of an electronic device.

For example, FIG. 1A is a schematic diagram of a structure of an electronic device 100. The electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a Subscriber Identity Module (SIM) card interface 195, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

The electronic device 100 implements a display function by using the GPU, the display 194, the application processor, and the like. The GPU is a microprocessor for image processing, and is connected to the display 194 and the application processor. The processor 110 may include one or more GPUs that execute program instructions to generate or change display information.

The display 194 is configured to display an image, a video, and the like. The display 194 includes a display panel. In some embodiments, the electronic device 100 may include one or N displays 194, where N is a positive integer greater than 1.

In embodiments of this disclosure, the display 194 may display a photographing preview interface, a video recording preview interface, and a photographing interface of the camera, may further display a video playing interface during video playback, and the like.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into a visible image.

The camera 193 is configured to capture a static image or a video. An optical image of an object is generated through the lens, and is projected onto a photosensitive element. In some embodiments, the electronic device 100 may include one or N cameras 193, where N is a positive integer greater than 1. The camera 193 may be located in an edge area of the electronic device, may be an off-screen camera, or may be a pop-up camera. The cameras 193 may include a rear-facing camera, and may further include a front-facing camera. A specific location and form of the camera 193 are not limited in embodiments of this disclosure.

The video codec is configured to compress or decompress a digital video. The electronic device 100 may support one or more video codecs. In this way, the electronic device 100 may play or record videos in a plurality of coding formats, for example, Moving Picture Experts Group (MPEG)-1, MPEG-2, MPEG-3, and MPEG-4.

The internal memory 121 may be configured to store computer-executable program code, and the executable program code includes instructions. The processor 110 runs the instructions stored in the internal memory 121 to perform various function applications of the electronic device 100 and process data. The internal memory 121 may include a program storage area and a data storage area. The program storage area may store an operating system, an application required by at least one function (for example, a voice playing function or an image playing function), and the like. The data storage area may store data (for example, an image captured by the electronic device 100, audio data, and a phone book) created in a process of using the electronic device 100, and the like.

In embodiments of this disclosure, the processor 110 runs the instructions stored in the internal memory 121, so that the electronic device performs the video processing method in this disclosure, and adjusts an audio timestamp based on a value of a latency.

The electronic device 100 may implement audio functions such as music playing and recording by using the audio module 170, the speaker 170A, the receiver 170B, a plurality of microphones 170C, the headset jack 170D, the application processor, and the like.

The audio module 170 is configured to convert digital audio data into an analog audio electrical signal for output, and is also configured to convert an analog audio electrical signal input into digital audio data. For example, the audio module 170 is configured to convert an analog audio electrical signal output by the microphone 170C into digital audio data.

The audio module 170 may further include an audio processing module. The audio processing module is configured to perform audio processing on digital audio data in a video recording mode, to generate audio. The audio module 170 may be further configured to code and decode audio data.

In some embodiments, the audio module 170 may be disposed in the processor 110, or some function modules in the audio module 170 are disposed in the processor 110.

The speaker 170A, also referred to as a "loudspeaker", is configured to convert an analog audio electrical signal into a sound signal. The electronic device 100 may be configured to listen to music or answer a hands-free call by using the speaker 170A.

The receiver 170B, also referred to as an "earpiece", is configured to convert an analog audio electrical signal into a sound signal. When a call is answered or voice information is received by using the electronic device 100, the receiver 170B may be put close to a human ear to receive a voice.

The microphone 170C, also referred to as a "mike" or a "mic", is configured to convert a sound signal into an analog audio electrical signal. When making a call or sending voice information, the user may make a sound near the microphone 170C through the mouth of the user, to input a sound signal to the microphone 170C. In this embodiment of this disclosure, the electronic device 100 may include at least three microphones 170C. The electronic device 100 may implement a function of collecting sound signals in all directions, and converting the collected sound signals into an analog audio electrical signal, and may further implement a noise reduction function, a sound source identification function, a directional recording function, and the like.

Figure 1B:
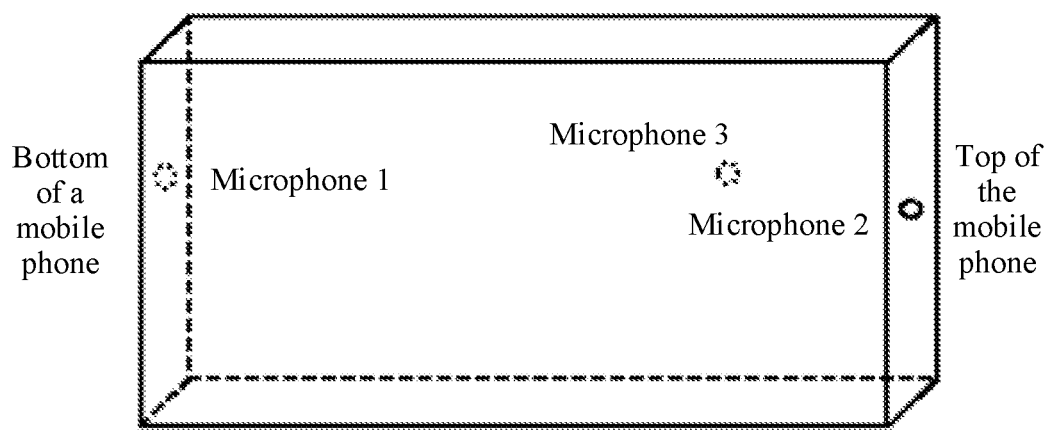
FIG. 1B is an example of a schematic diagram of a microphone layout on an electronic device.

For example, a layout of the microphones 170C on the electronic device 100 may be shown in FIG. 1B. The electronic device 100 may include a microphone 1 disposed at the bottom, a microphone 2 disposed at the top, and a microphone 3 disposed on the rear. A combination of the microphones 1 to 3 may capture sound signals in all directions around the electronic device 100. It should be noted that the electronic device 100 may further include more microphones 170C. For example, the electronic device 100 may include one or more microphones disposed at the bottom, one or more microphones disposed at the top, one or more microphones disposed on the rear, and one or more microphones disposed on the front of a screen. These microphones may capture sound signals in all directions around the electronic device 100. The screen is the display 194 or a touchscreen.

It should be noted that the microphone 170C may be a built-in component of the electronic device 100, or may be an external accessory of the electronic device 100. For example, the electronic device 100 may include a microphone 1 disposed at the bottom, a microphone 2 disposed at the top, and an external accessory. For example, the external accessory may be a micro microphone connected (in a wired or wireless manner) to the electronic device 100 or a headset with a microphone (for example, a wired headset or a True Wireless Stereo (TWS) headset).

It may be understood that the structure shown in this embodiment of this disclosure does not constitute a specific limitation on the electronic device 100. In some other embodiments of this disclosure, the electronic device 100 may include more or fewer components than those shown in the figure, or some components may be combined, or some components may be split, or there may be a different component layout. The components shown in the figure may be implemented by hardware, software, or a combination of software and hardware.

A software system of the electronic device 100 may use a layered architecture, an event-driven architecture, a microkernel architecture, a micro service architecture, or a cloud architecture. In an embodiment of this disclosure, an ANDROID system with a layered architecture is used as an example to describe a software structure of the electronic device 100.

Figure 2:
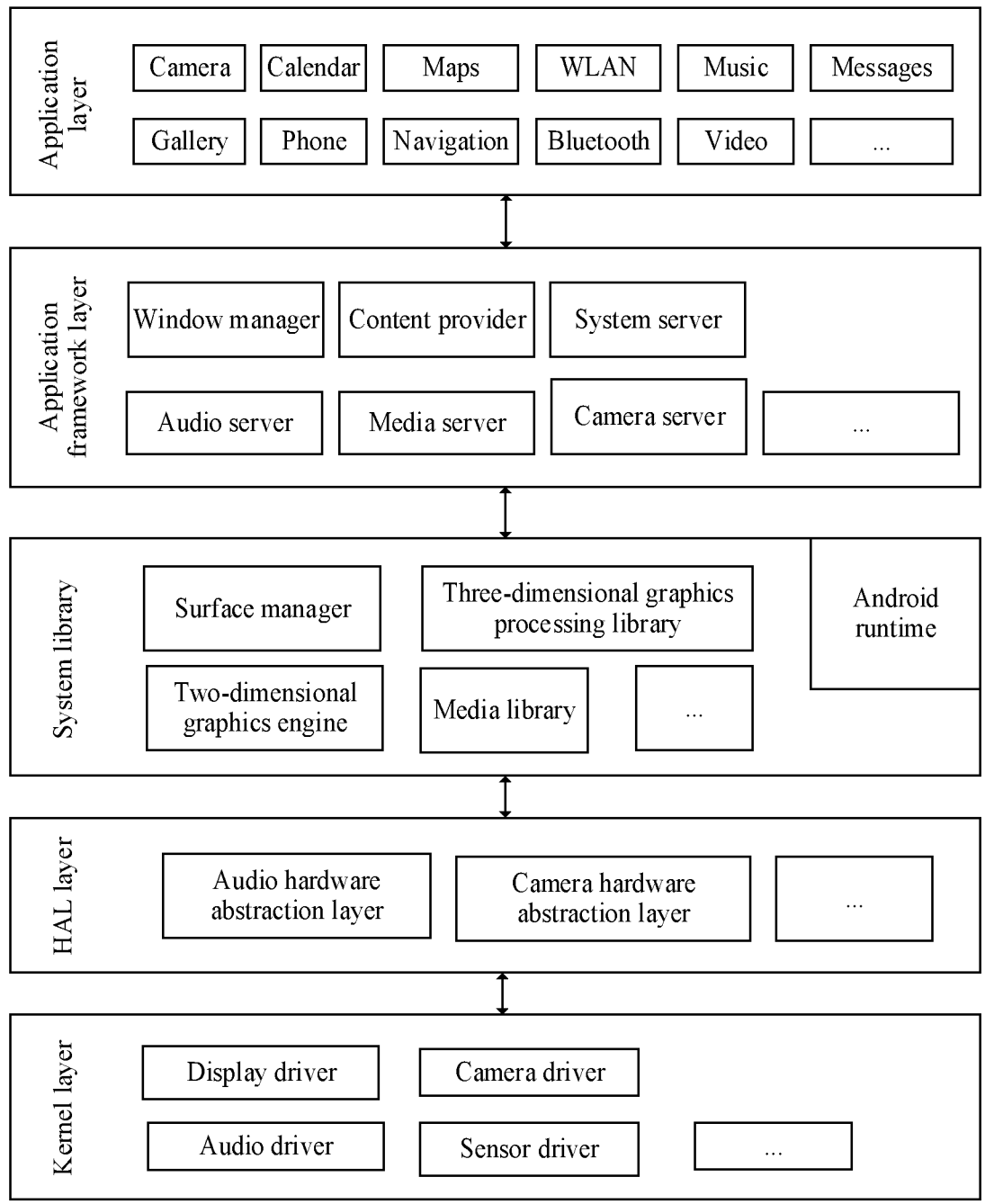
FIG. 2 is an example of a block diagram of a software structure of an electronic device.

FIG. 2 is a block diagram of the software structure of the electronic device 100 according to the embodiment of this disclosure. In the layered architecture, software is divided into several layers, and each layer has a clear role and task. The layers communicate with each other through a software interface. In some embodiments, the ANDROID system is divided into four layers: an application layer, an application framework layer, an ANDROID runtime and system library, and a hardware abstraction layer (HAL) from top to bottom. The application layer may include a series of application packages.

As shown in FIG. 2, the application packages may include applications such as camera, gallery, calendar, phone, map, navigation, wireless local area network (WLAN), BLUETOOTH, music, video, and messages.

The application framework layer provides an application programming interface (API) and a programming framework for an application at the application layer. The application framework layer includes some predefined functions.

As shown in FIG. 2, the application framework layer may include a media server, an audio server, a camera server, a system server, and the like.

For example, the media server is configured to manage audio data and image data, for example, control data stream directions of the audio data and the image data, and write an audio stream and an image stream into an MP4 file. It should be noted that, in the descriptions of embodiments of this disclosure, the audio data and the image data may also be respectively referred to as an audio stream and an image stream, or audio information and image information. This is not limited in this disclosure.

The audio server is configured to perform corresponding processing on the audio stream, for example, obtain an audio timestamp corresponding to the audio stream.

The camera server is configured to perform corresponding processing on the image stream, for example, obtain a video timestamp corresponding to the image stream.

Specific functions of the media server, the audio server, and the camera server are described in detail in the following embodiments.

The system library and runtime layer includes the system library and ANDROID runtime. The system library may include a plurality of function modules, such as a browser kernel, a 3D graphics library (for example, OpenGL for Embedded Systems), and a font library. The browser kernel is responsible for interpreting web page syntax (such as HyperText Markup Language and JavaScript in a standard universal markup language) and rendering (displaying) a web page. The 3D graphics library is configured to implement three-dimensional graphics drawing, image rendering, composition, layer processing, and the like. The font library is configured to input different fonts. The ANDROID runtime includes a kernel library and a virtual machine. The ANDROID runtime is responsible for scheduling and management of the ANDROID system. The kernel library includes two parts: a function that needs to be invoked in JAVA language and a kernel library of ANDROID. The application layer and the application framework layer run on the virtual machine. The virtual machine executes JAVA files of the application layer and the application framework layer as binary files. The virtual machine is configured to implement functions such as object lifecycle management, stack management, thread management, security and exception management, and garbage collection.

It may be understood that components included in the system framework layer and the system library and runtime layer shown in FIG. 2 do not constitute a specific limitation on the electronic device 100. In some other embodiments of this disclosure, the electronic device 100 may include more or fewer components than those shown in the figure, or some components may be combined, or some components may be split, or there may be a different component layout.

The HAL layer is an interface layer located between an operating system kernel and a hardware circuit. The HAL layer includes but is not limited to an audio HAL and a camera HAL. The audio HAL is configured to process the audio stream, for example, perform processing such as noise reduction and directional enhancement on the audio stream. The camera HAL is configured to process the image stream.

A kernel layer is a layer between hardware and a software layer. The kernel layer includes at least a display driver, a camera driver, an audio driver, and a sensor driver. The hardware may include components such as a camera, a display, a microphone, a processor, and a memory.

In embodiments of this disclosure, the display in the hardware may display a photographing preview interface, a video recording preview interface, and a photographing interface during video recording. The camera in the hardware may be configured to collect an image. The microphone in the hardware may be configured to collect a sound signal, and generate an analog audio electrical signal.

Figure 3:
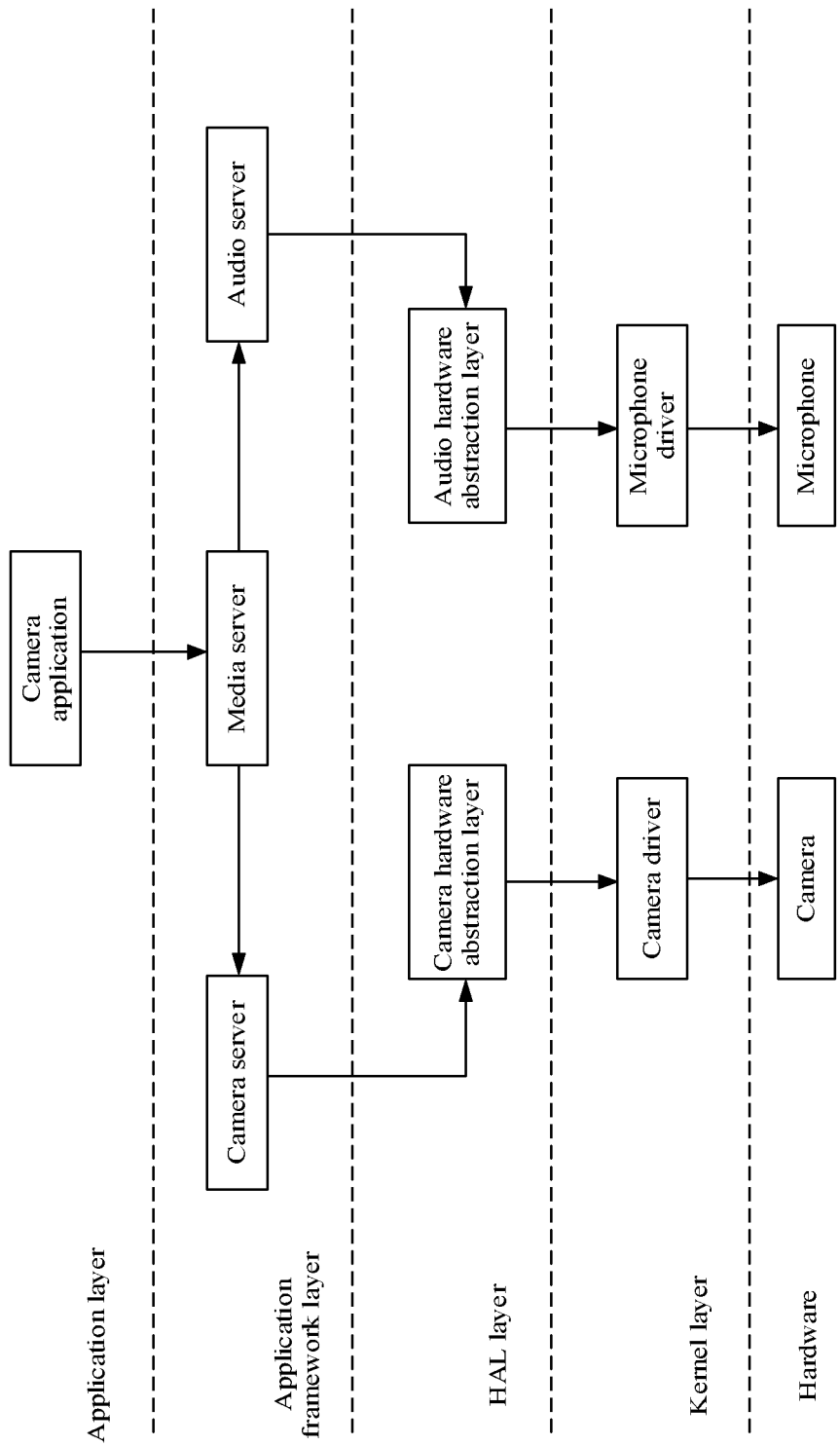
FIG. 3 is an example of a schematic flowchart of a creation process.
Figure 4:
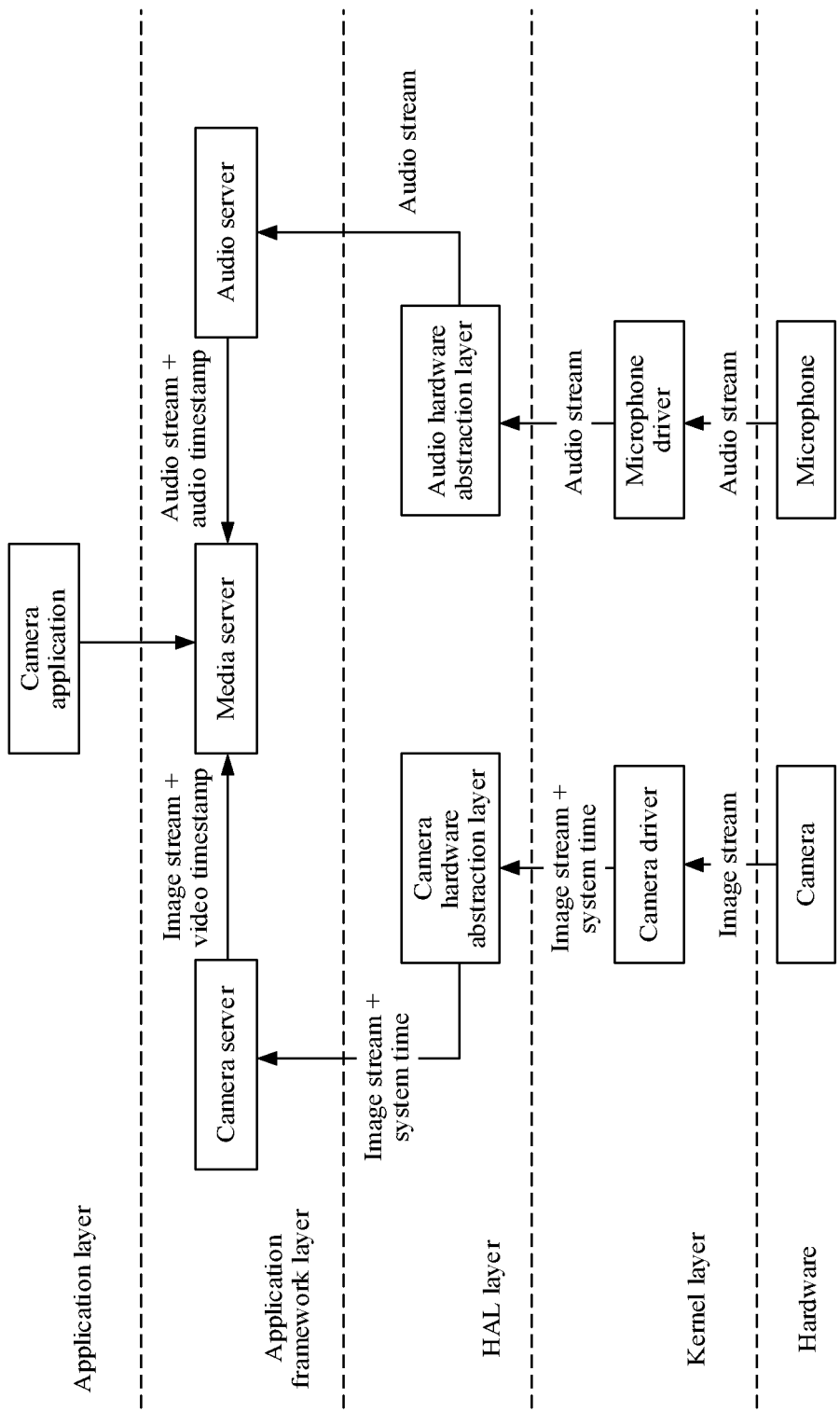
FIG. 4 is an example of a schematic flowchart of a recording process.

Based on the diagram of the software structure of the electronic device shown in FIG. 2, with reference to schematic diagrams of module interaction shown in FIG. 3 and FIG. 4, the following briefly describes a specific procedure in a photographing (or recording) process and a reason why an audio-visual asynchronization problem occurs due to a change of a focal length.

For example, the recording process of the electronic device may be divided into two parts. A first part is a creation process in which each module creates a corresponding instance, or may be understood as a preparation process, as shown in FIG. 3. A second part is a recording process, namely, a process in which each instance processes obtained data (audio or an image), as shown in FIG. 4. Each module mainly creates the corresponding instance in the creation process; and each instance processes data (including an audio stream and an image stream) in the recording process.

First Part: The Creation Process

1. The camera application is started and invokes the media server, so that the media server creates a corresponding instance. After detecting an operation of opening the camera (which may also be referred to as the camera application below) by the user, the mobile phone starts the camera application. In response to a user instruction, the camera application creates a media recorder instance at the framework layer through an interface with the framework layer, to start the recording process. The media recorder instance indicates the media server to create the corresponding instance. It should be noted that the "instance" in embodiments of this disclosure may also be understood as program code or process code running in a process, and is used to perform corresponding processing on received data (for example, an audio stream or an image stream). It should be noted that the camera application is used as an example for descriptions in embodiments of this disclosure. In another embodiment, the application may alternatively be another application having a photographing function, for example, a camera function in a chat application. This is not limited in this disclosure.

For example, in response to an indication of the Media Recorder instance, the media server creates an instance corresponding to audio and an image. The media server creates a Stagefright Recorder (recording processing) instance. The Stagefright Recorder instance is configured to manage initialization and data stream directions of audio and image data.

The Stagefright Recorder instance is configured to create a camera source instance, an audio record instance, a video encoder instance, an audio encoder instance, and an Mpeg4 Writer instance. In embodiments of this disclosure, only creating a file in an MP4 format is used as an example for description. In another embodiment, another video format may be generated, and a corresponding instance may be created.

2. The media server indicates the camera server and the audio server to create corresponding instances.

For example, the camera source instance indicates the camera server to create a camera instance, and the audio record instance indicates the audio server to create a record thread instance. Correspondingly, the camera server creates the camera instance, and the audio server creates the record thread instance.

3. The camera server indicates the camera HAL to create a corresponding instance, and the audio server indicates the audio HAL to create a corresponding instance.

For example, the camera instance indicates the camera HAL to create a Camera 3Device (where the number 3 indicates a version number of the camera server, and may be updated with a version) instance, and the record thread instance indicates the audio HAL to create an input stream instance and a recording directional enhancement algorithm instance. It should be noted that the recording directional enhancement algorithm instance may be enabled only in a zoom photographing scenario. A specific implementation process is described in detail below.

4. The camera HAL invokes the camera driver, and the audio HAL invokes a microphone driver. For example, the Camera 3Device instance triggers startup of the camera driver, and the input stream instance triggers startup of the microphone driver.

5. The camera driver invokes the camera to collect an image stream, and the microphone driver invokes the microphone to collect an audio stream.

Second Part: The Recording Process

1. The camera outputs the collected image stream to the camera driver, and the microphone outputs the picked-up audio stream to the microphone driver.

2. The camera driver outputs the image stream and a corresponding system time to the camera HAL, and the microphone driver outputs the audio stream to the audio HAL. For example, the Camera 3Device instance obtains the image stream input by the camera and the corresponding system time, and the recording directional enhancement algorithm instance obtains the audio stream input by the microphone driver, and outputs the obtained audio stream to the input stream instance.

For example, the image stream includes a plurality of images, and the system time is a system time corresponding to collecting each image by the camera. For example, the system time may be consistent with a real time (namely, a physical world time).

3. The camera HAL outputs the obtained image stream and system time to the camera server, and the audio HAL outputs the obtained audio stream to the audio server.

For example, the camera instance obtains the image stream and the system time that are input by the Camera 3Device instance, and the record thread instance obtains the audio stream input by the input stream instance.

4. The camera server obtains a timestamp corresponding to each image (referred to as a video timestamp for short in the following) in the image stream, and outputs each image in the image stream and the video timestamp corresponding to each image to the media server. In addition, the audio server obtains a timestamp corresponding to each audio stream (referred to as an audio timestamp for short in the following), and outputs each audio stream and the audio timestamp corresponding to each audio stream to the media server.

For example, the camera source instance obtains the images in the image stream input by the camera instance and the video timestamp corresponding to each image, and the audio record instance obtains the audio streams input by the record thread instance and the audio timestamp corresponding to each audio stream.

It should be noted that the video timestamp and the audio timestamp are relative times calculated based on a recording start time, where the recording start time is 0 milliseconds (ms). In other words, the video timestamp may be understood as a relative time converted based on the video recording start time and the system time corresponding to each image. The audio timestamp is similar. For example, it is assumed that the audio timestamp is 60 ms, which indicates that an interval between a collection moment of the audio stream corresponding to the audio timestamp and the video recording start moment (namely, 0 ms) is 60 ms. Details are not repeated in the following, and a manner of obtaining the audio timestamp is described in detail in the following.

5. The media server generates an MP4 file based on the obtained plurality of images, the obtained video timestamp corresponding to each image, the obtained plurality of audio streams, and the obtained audio timestamp corresponding to each audio stream.

For example, the camera source instance outputs the obtained plurality of images and the video timestamp corresponding to each image to the video encoder instance, and the audio record instance outputs the obtained plurality of audio streams and the audio timestamp corresponding to each audio stream to the audio encoder instance.

The video encoder instance encodes the plurality of images to generate corresponding image frames. Each image frame corresponds to a video timestamp (namely, the video timestamp corresponding to the image described above). In addition, the video encoder instance outputs the plurality of image frames and the video timestamp corresponding to each image frame to the Mpeg4 Writer instance. In addition, the audio encoder instance encodes the plurality of audio streams to generate corresponding audio frames. Each audio frame corresponds to an audio timestamp (namely, the audio timestamp corresponding to the audio stream described above). The audio encoder instance outputs the plurality of audio frames and the audio timestamp corresponding to each audio frame to the Mpeg4 Writer instance.

For example, the Mpeg4 Writer instance generates the MP4 file based on the obtained plurality of images, the obtained video timestamp corresponding to each image, the obtained plurality of audio streams, and the obtained audio timestamp corresponding to each audio stream. The MP4 file includes image data (namely, the plurality of image frames) and audio data (namely, the plurality of audio frames). When the MP4 file is played on any platform or player, the player separately decodes the image frames and the audio frames based on an MPEG-4 standard, to obtain original images corresponding to the image frames and original audio corresponding to the audio frames. The player may align, based on the video timestamp corresponding to the image frame and the audio timestamp corresponding to the audio frame, the images and the audio that are obtained through decoding, so that the images and the audio are played synchronously.

The following briefly describes the video timestamp and the audio timestamp.

As described above, the MP4 file includes the image data and the audio data. During playing, the image data and the audio data are decoded independently, and are played independently after being decoded.

It should be noted that a playing speed of a video picture (namely, an image) is determined by a frame rate. The frame rate is a frequency (rate) at which a bitmap image continuously appears on a display in a unit time. The frame rate may also be referred to as a frame frequency, and is represented by Hertz (Hz). An audio playing speed is determined by an audio sampling rate. The audio sampling rate refers to a quantity of times that a recording device samples audio signals within one second.

In this disclosure, an example in which playing duration of each audio frame is 20 ms and playing duration of each image frame is 17 ms is used for description. It should be noted that in another embodiment, playing duration of an audio frame may be 23.22 ms, playing duration of an image frame may be 33 ms, and the like. This is not limited in this disclosure.

In an ideal situation, the audio and the video picture are completely synchronized (referred to as audio and image synchronization for short). However, due to impact of factors such as decoding, audio and image asynchronization may occur. To implement audio and image synchronization, a timestamp is introduced in other technologies, to calibrate the audio and the video image through the timestamp, so as to implement audio and image synchronization.

The following separately describes in detail a manner of calculating the video timestamp and a manner of calculating the audio timestamp.

The manner of calculating the video timestamp is described as follows: descriptions are provided by using a single image as a granularity. The camera server (specifically, the camera instance) may calculate, based on a system time that is input by the camera HAL (specifically, the Camera 3Device instance) and that corresponds to the image and with reference to the video recording start time, a video timestamp corresponding to the image, namely, relative duration between the system time and the start time. For example, the relative duration between the system time and the start time is 17 ms. In other words, the video timestamp corresponding to the image is 17 ms. For example, after the media server (specifically, the media encoder instance) encodes the image, the video timestamp corresponds to an image frame corresponding to the image.

The manner of calculating the audio timestamp is as follows: the audio server (specifically, the record thread instance) calculates an audio timestamp corresponding to an audio frame based on a general formula of the audio timestamp. The general formula of the audio timestamp is as follows:

$$\text{the audio timestamp} = N \times l \tag{1}$$

Herein, N is a quantity of reading times, and l is an audio frame length (in a unit of ms). For example, the quantity of reading times is a quantity of times that the audio server (specifically, the record thread instance) periodically reads audio from the audio HAL (specifically, the input stream instance). The audio frame length is equal to a reading period of the audio server, namely, period duration when the audio server periodically reads audio from the audio HAL. It may be understood that audio streams collected by the microphone and output to the audio HAL are continuous, and the audio server reads, at a trigger moment of each reading period, the audio streams obtained by the audio HAL. In other words, the audio server obtains one or more audio streams whose duration is equal to the reading period duration. It should be noted that the reading period (namely, the audio frame length) may be set by each manufacturer based on an actual situation. For example, if the reading period of the audio server is 20 ms, a corresponding frame length of each audio frame is 20 ms, and the audio server reads audio from the audio HAL every 20 ms. For example, an audio timestamp corresponding to audio read for the third time is 3×20 ms, namely, 60 ms.

FIG. 5 is a schematic diagram of a process of playing audio and an image based on a timestamp. As shown in FIG. 5, in the playing process, audio and image synchronization is implemented based on a reference clock. For example, when an audio frame with a timestamp of 20 ms is played, an image frame corresponding to a timestamp of 17 ms (namely, an image frame corresponding to a video timestamp closest to a reference time of 20 ms) is played. It should be noted that in this disclosure, an example in which a reference timeline is the same as an audio timeline is used. In other words, in the playing process, an audio timestamp is used as the reference clock to synchronize an image to audio. Alternatively, it may be understood as that the image is synchronized based on a playing speed of the audio. In another embodiment, the reference timeline may alternatively be an image timeline or an external clock. This is not limited in this disclosure. For specific implementation details of timestamp-based synchronization, refer to the audio and image synchronization solution in other technologies. Details are not described in this disclosure.

As described above, audio and image synchronization is implemented by aligning the audio timestamp with the video timestamp. However, when the audio and image timestamps deviate from an actual physical time (namely, a real-world time) of recording, even if the timestamps are aligned, audio and image asynchronization may still occur.

A possible cause is that a focal length changes during photographing. For example, the camera application may determine, in response to a detected user operation behavior, that a current zoom ratio is 15(×) (where 15× shown in the figure indicates that the zoom ratio is 15). The mobile phone may adjust the photographing focal length based on the current zoom ratio (for example, 15×).

It should be noted that, in the descriptions of embodiments of this disclosure, the photographing focal length may also be referred to as an imaging distance, namely, a distance between the camera and a zoom range corresponding to the zoom ratio. For example, a correspondence between different zoom ratios and imaging distances is stored in the memory of the mobile phone, for example, may be stored in a form of a relationship table. A module or an instance (for example, the audio HAL or the camera HAL) may determine, by querying the relationship table, the imaging distance corresponding to the current zoom ratio. For example, if the zoom ratio is X, and X is 3, a corresponding imaging distance is 10 meters. In other words, the camera collects a picture with an imaging distance of 10 meters away from the camera. It should be further noted that, for electronic devices of different vendors, manners for conversion between a zoom ratio and an imaging distance may be the same or may be different. This is not limited in this disclosure. For example, in a case of a same zoom ratio X, an imaging distance that is configured by an electronic device of a vendor A and that corresponds to the zoom ratio X is 8 meters, and an imaging distance that is configured by an electronic device of a vendor B and that corresponds to the zoom ratio X is 10 meters. This depends on configuration and performance of the electronic devices. A correspondence between a zoom ratio and an imaging distance in embodiments of this disclosure is merely an example, and is not limited in this disclosure.

Figure 6:
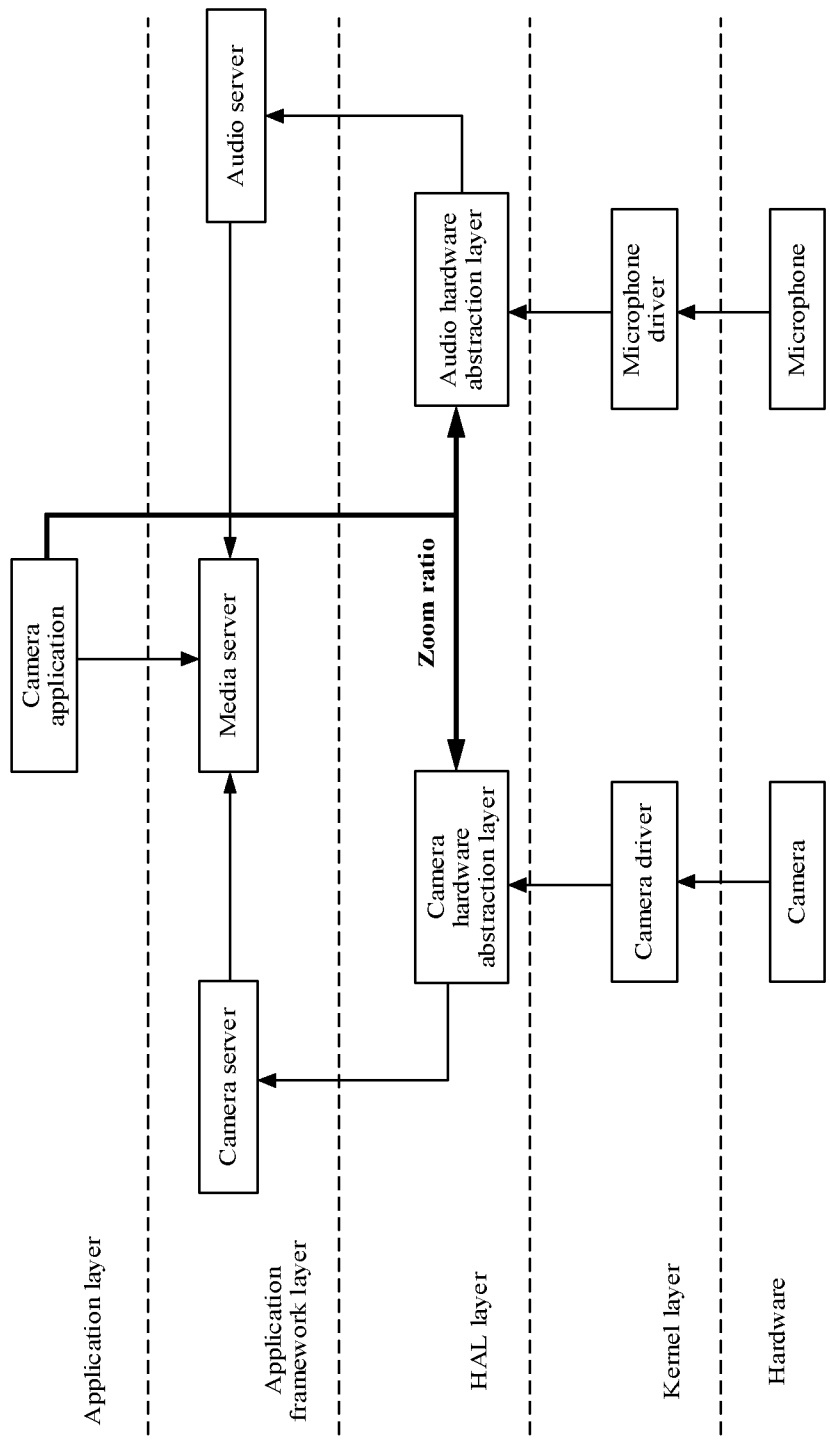
FIG. 6 is an example of a schematic flowchart of module interaction.

Based on FIG. 3, the following describes a module interaction procedure in a zoom ratio adjustment scenario with reference to FIG. 6. As shown in FIG. 6, after obtaining the zoom ratio, the camera application outputs the zoom ratio to the camera HAL and the audio HAL. For example, the camera HAL inputs the zoom ratio to the camera driver, and the camera driver controls the camera to collect, based on the zoom ratio, an image within a zoom range corresponding to the current zoom ratio. For a specific implementation of collecting an image by the camera through zooming, refer to other technologies. This is not limited in this disclosure.

Still refer to FIG. 6. The following describes a processing manner on an audio transmission path in detail. The audio HAL may process, based on a received zoom ratio and through the recording directional enhancement algorithm instance, audio collected by one or more microphones, to narrow a mono beam or narrow an included angle of a stereo beam, so as to retain a sound within a zoom range, and suppress a sound out of the zoom range to highlight the sound within the zoom range, thereby implementing directional sound pickup. The zoom range is a photographing range corresponding to a current zoom ratio.

It should be noted that, after the focal length is enlarged (that is, the zoom ratio increases), because the corresponding imaging distance increases, there is a sound propagation latency between a time at which the microphone collects the sound and a time at which the sound actually occurs. For example, as described above, after the zoom ratio increases, the audio HAL (specifically, the recording directional enhancement algorithm instance) processes the audio based on the zoom ratio, and an algorithm processing latency is introduced in the processing process. It should be noted that, the algorithm processing latency means that during calculation, the recording directional enhancement algorithm in the audio HAL waits for duration of at least one audio frame, for example, a length of two audio frames, for example, 40 ms, to determine a processing result of a previous audio frame, for example, enhancement strength. More consecutive sampling frames indicate more reference signals and a better corresponding algorithm processing effect. However, more waited audio frames indicate a larger latency caused by the algorithm. For a specific algorithm, refer to other technologies. Details are not described in this disclosure.

Therefore, due to impact of the sound propagation latency and the algorithm processing latency, audio and image asynchronization may occur.

Figure 7A:
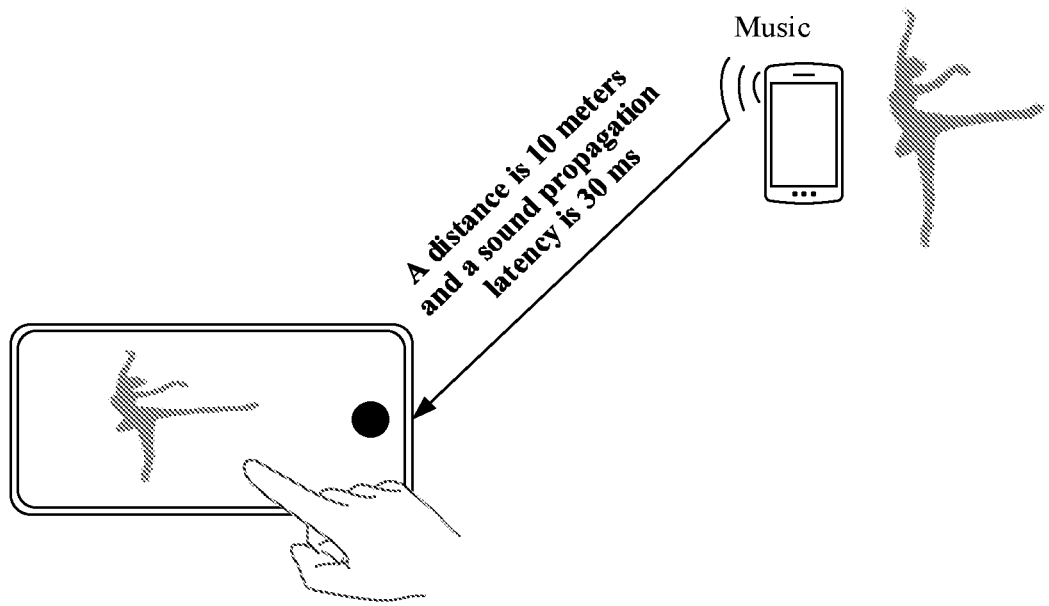
FIG. 7A is an example of a schematic diagram of an application scenario.

The following uses specific embodiments to describe in detail the impact of the sound propagation latency and the algorithm processing latency on audio and image synchronization. For example, FIG. 7A is an example of a schematic diagram of a scenario. The user holds the mobile phone 10 meters away from a photographed object, where the photographed object is dancing, and a mobile phone next to the photographed object (for example, within a range of 1 meter) synchronously plays music.

Figure 7B:
FIG. 7B is an example of a schematic diagram of a photographing scenario.

After the camera application is started, a mobile phone screen displays a photographing interface (or referred to as a photographing preview interface), as shown in FIG. 7B. Refer to FIG. 7B. In addition to displaying a currently photographed video picture, the photographing preview interface further includes but is not limited to a focal length adjustment option, a recording start option, a recording pause option, a recording stop option, and the like. For example, in a photographing process, the camera application determines, in response to a user instruction, that a current zoom ratio is 6.1×. The camera application outputs the zoom ratio (namely, 6.1×) to the camera HAL and the audio HAL. The camera HAL and the audio HAL may determine, by querying the table of the correspondence between a zoom ratio and an imaging distance, that an imaging distance corresponding to the zoom ratio of 6.1× is 10 meters, that is, an image and a sound currently collected by the camera and the microphone are an image and a sound that are 10 meters away from the mobile phone. It should be noted that values in FIG. 7A and FIG. 7B are merely examples. In another embodiment, for example, if a photographed object dances 10 meters away from the camera, a zoom ratio detected by the mobile phone is 5.1, and a corresponding imaging distance is 6 meters, a zoom range is a photographed picture at a distance of 6 meters.

As described above, an increase of the zoom ratio does not affect the video picture. To be specific, there is no error between the video timestamp corresponding to each image frame in the MP4 file generated by the mobile phone and an actual occurrence time of a picture of the image frame, or the error may be ignored. However, due to the impact of the sound propagation latency and the algorithm processing latency, there is a latency (including the sound propagation latency and the algorithm processing latency) between the audio timestamp corresponding to each audio stream (namely, an audio stream collected after zooming) in the MP4 file and an actual occurrence time of a sound corresponding to the audio stream. For example, in the scenario shown in FIG. 7A, when the imaging distance is 10 meters, the sound propagation latency is about 30 ms. In other words, a sound collected by the microphone at a current moment is actually sent by the phone next to the object 30 ms ago.

Figure 7C:
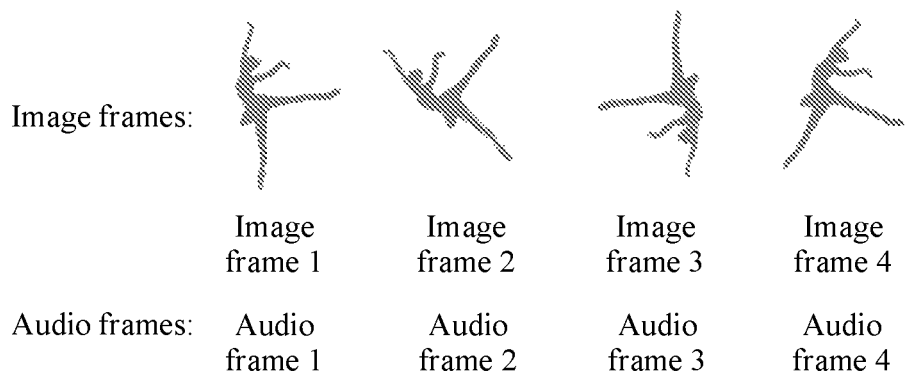
FIG. 7C is an example of a schematic diagram of a correspondence between an image and audio.

For example, FIG. 7C shows an actual correspondence between an image and audio that are photographed in the scenario shown in FIG. 7B. As shown in FIG. 7C, for example, an audio frame corresponding to an image frame 1 corresponding to an action 1 is an audio frame 1. In other words, when the photographed object jumps the action 1, the mobile phone next to the photographed object plays audio corresponding to the audio frame 1. By analogy, an image frame 2 (namely, an image frame corresponding to an action 2) corresponds to an audio frame 2, an image frame 3 corresponds to an audio frame 3, and an image frame 4 corresponds to an audio frame 4. It is assumed that a correct audio timestamp (namely, actual duration between a sound occurrence time and a recording start time) of the audio frame 1 is 20 ms, a correct audio timestamp of the audio frame 2 is 40 ms, a correct audio timestamp of the audio frame 3 is 60 ms, and a correct audio timestamp of the audio frame 4 is 80 ms.

Figure 7D:
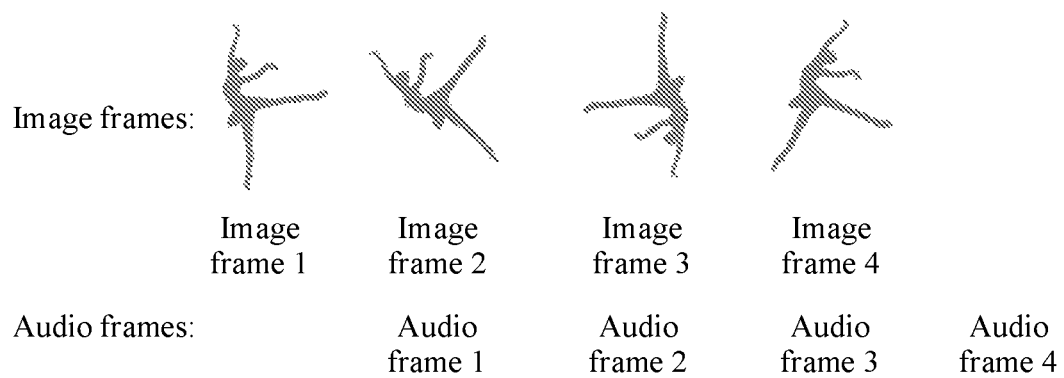
FIG. 7D is an example of a schematic diagram of a correspondence between an image and audio.

However, due to the impact of the sound propagation latency and the algorithm processing latency, the audio and the image in the MP4 file generated by the mobile phone are not synchronized. For example, when the electronic device (for example, the mobile phone) plays the image frame and the audio frame in the MP4 file, as shown in FIG. 7D, the image frame 2 played by the mobile phone corresponds to the audio frame 1. In other words, when an image displayed in the video picture of the mobile phone is an image (or a picture) corresponding to the image frame 2, audio corresponding to the audio frame 1 is played in the speaker. By analogy, when an image displayed in the video picture is an image corresponding to the image frame 3, audio corresponding to the audio frame 2 is played in the speaker, and the like. A reason for FIG. 7D is that: a written audio timestamp (namely, an audio timestamp that corresponds to the audio frame 1 and that is recorded in the MP4 file) that is of the audio frame 1 and that is written into the MP4 file is 40 ms, a written audio timestamp of the audio frame 2 is 60 ms, a written audio timestamp of the audio frame 3 is 80 ms, and a written audio timestamp of the audio frame 4 is 100 ms. Therefore, when the mobile phone plays corresponding audio frames and image frames based on the audio timestamps (namely, the written audio timestamps) and the video timestamps, a problem shown in FIG. 7D occurs. To be specific, a played dance action does not match the music, and the music is slower than the dance action.

Figure 8:
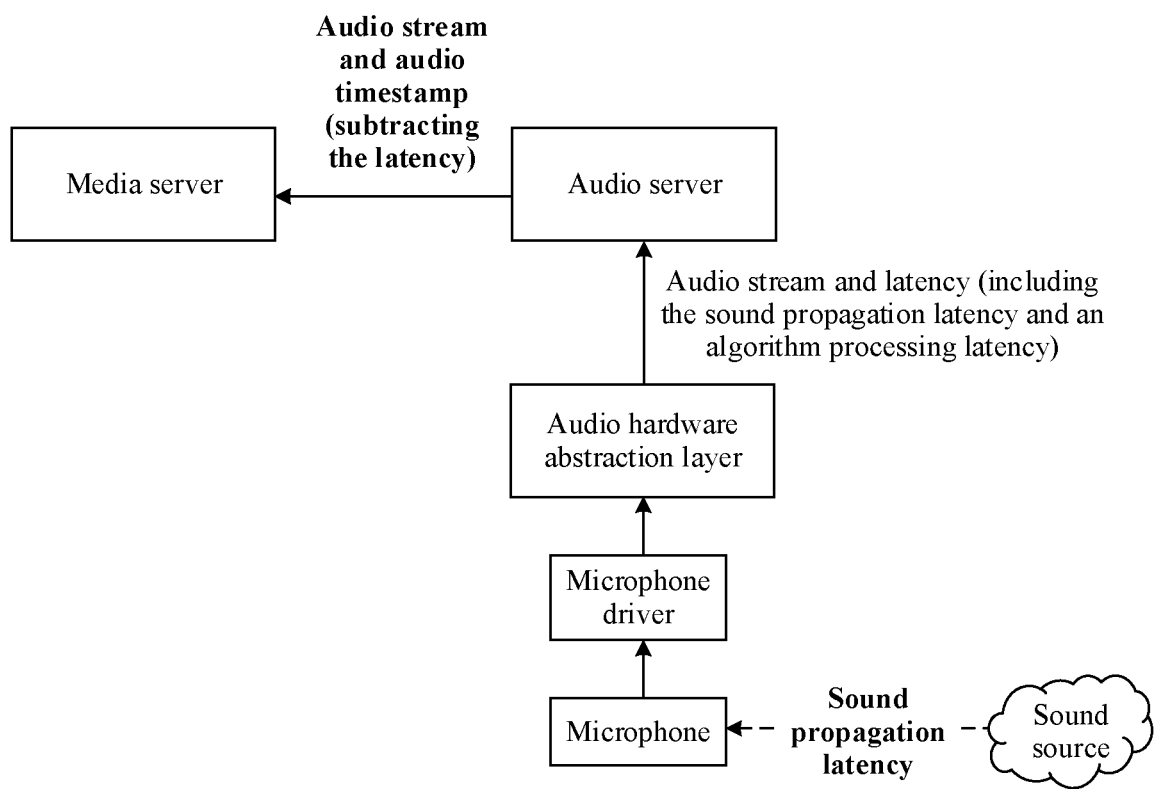
FIG. 8 is a schematic principle diagram of a video processing method according to an embodiment of this disclosure.

In conclusion, due to the impact of the sound propagation latency and the algorithm processing latency, there is a deviation between a generated audio timestamp and a time at which a sound occurs in the physical world, and the latency may be dozens or even hundreds of milliseconds. However, impact of a light propagation speed and a system processing time on a video timestamp can be ignored. In other words, it may be considered that there is no deviation between the video timestamp and an actual occurrence time of a video picture corresponding to the video timestamp. Therefore, even if the audio timestamp is aligned with the video timestamp in the playing process, the audio and the video picture are still asynchronous due to the impact of the latency (including the sound propagation latency and the algorithm processing latency). To resolve a problem of audio and image asynchronization caused by a focal length change, this disclosure provides a video processing method. FIG. 8 is a principle diagram of the video processing method according to this disclosure. As shown in FIG. 8, an audio timestamp generated by the audio server and output to the media server is a result obtained by subtracting a latency (which may also be referred to as an audio latency) from an original audio timestamp (namely, an audio timestamp calculated based on the formula 1), to calibrate the audio timestamp and implement audio and image synchronization, where the latency includes the sound propagation latency, or includes the sound propagation latency and the algorithm processing latency. It should be noted that this disclosure is described by using an example in which the audio timestamp is processed by the audio server (specifically, the record thread instance). In another embodiment, the audio timestamp may be processed by another module or instance in the electronic device, for example, the media server, optionally the audio record instance, or the audio HAL, optionally the input stream instance. This is not limited in this disclosure.

The following describes the technical solutions of this disclosure in detail by using several specific embodiments.

Embodiment 1

The mobile phone starts the camera application in response to a user operation behavior, and the camera application identifies that an initial zoom ratio is X. For example, in this embodiment, the zoom ratio being 3× is used as an example for description. In another embodiment, the zoom ratio may alternatively be 5×, 1.5×, or the like. This is not limited in this disclosure.

For example, after the camera application is started, a creation process of each instance is executed. For specific details, refer to related descriptions in FIG. 3. Details are not described herein again. For example, after the creation process of each instance is completed, or in the creation process of each instance, the camera application outputs the zoom ratio X to the camera HAL and the audio HAL. For specific details, refer to related descriptions in FIG. 6. Details are not described herein again.

In a possible implementation, the audio HAL may determine, based on a received zoom ratio, whether the video processing method in embodiments of this disclosure needs to be triggered. For example, after the camera application is started, the camera application outputs the initial zoom ratio to the audio HAL. Optionally, the initial zoom ratio may be greater than or equal to 1. In an example, the audio HAL receives the zoom ratio X input by the camera application, and detects that the zoom ratio X is greater than a specified zoom ratio, for example, 2×. The audio HAL determines that the video processing method in this disclosure needs to be triggered. In another example, if detecting that the zoom ratio is less than or equal to the specified zoom ratio, the audio HAL determines not to trigger the technical solution of this disclosure. In other words, processing is performed based on the recording procedure shown in FIG. 3. It should be noted that the initial zoom ratio may be a zoom ratio that is obtained and stored by the camera application for the last time in a previous recording process, or the initial zoom ratio may be a zoom ratio set by the user on a preview interface (an interface on which recording has not started). Optionally, the user may set a corresponding zoom ratio by using a zoom ratio option provided on a photographing interface. Optionally, the user may set the corresponding zoom ratio by using a mode setting option provided on the photographing interface. For example, different modes correspond to different zoom ratios. For example, a zoom ratio corresponding to a distant photographing mode is 5×. This is not limited in this disclosure.

In another possible implementation, after recording starts, the audio HAL may perform the technical solution in embodiments of this disclosure. In other words, in a scenario in which the zoom ratio is less than the specified zoom ratio, for example, the zoom ratio is 1×, the audio HAL may still perform the technical solution in this disclosure, for example, correct an audio timestamp based on a latency. Different from a latency obtained in a scenario in which the zoom ratio is greater than the specified zoom ratio, a latency obtained by the audio HAL in the scenario in which the zoom ratio is 1 is 0, and an audio timestamp after correction is the same as that before correction.

It should be noted that, unless otherwise specified, for a processing procedure of an image thread, refer to the procedure shown in FIG. 3. In the following embodiments, only a processing procedure of an audio thread is described in detail.

Still refer to FIG. 8. The microphone driver obtains, from the microphone, an audio stream collected by the microphone, and the microphone driver inputs the obtained audio stream to the audio HAL.

The recording directional enhancement algorithm instance in the audio HAL may process the audio stream based on the zoom ratio X. For example, processing performed by the recording directional enhancement algorithm instance on the audio stream includes but is not limited to processing such as audio enhancement and noise reduction in a zoom range. The recording directional enhancement algorithm instance outputs a processed audio stream to the input stream instance, and the input stream instance further processes the audio stream. The processing includes but is not limited to: re-sampling, channel conversion, and the like.

In this disclosure, in addition to processing the audio stream, the input stream instance of the audio HAL further obtains a latency (including the sound propagation latency, or including the sound propagation latency and the algorithm processing latency), to output the audio stream and the latency (which may also be referred to as latency information) to the record thread instance when the record thread instance of the audio server periodically reads data from the input stream instance.

The following describes a manner in which the input stream instance of the audio HAL obtains the latency. As described above, the latency may include the sound propagation latency, or may include the sound propagation latency and the algorithm processing latency. It should be noted that, if the sound propagation latency is far greater than the algorithm processing latency, the algorithm processing latency may be ignored. For example, if an effective collection range of the microphone may reach 30 meters or even farther, the sound propagation latency may reach more than 100 ms. In this case, if the algorithm processing latency is 20 ms to 40 ms, the algorithm processing latency may be ignored for the sound propagation latency. Optionally, in this example, the input stream instance may still output the audio stream, the sound propagation latency, and the algorithm processing latency to the record thread instance, and the record thread instance ignores the algorithm processing latency when calculating an audio timestamp. Optionally, the input stream instance may output only the audio stream and the sound propagation latency to the record thread instance.

For example, a manner of calculating the sound propagation latency is as follows:

$$\text{the second propagation latency (ms)} = \frac{d}{c \times 1000} \qquad (2)$$

Herein, d represents an imaging distance (in a unit of meter (m)) corresponding to the zoom ratio X, and c represents a propagation speed of a sound in the air (340 meters per second (m/s)).

In this disclosure, the algorithm processing latency is a fixed value, and the value is obtained through an experiment, and ranges from about 1 ms to 100 ms. A specific value is set based on an experiment result. This is not limited in this disclosure.

Figures 9, 10A, 10B:
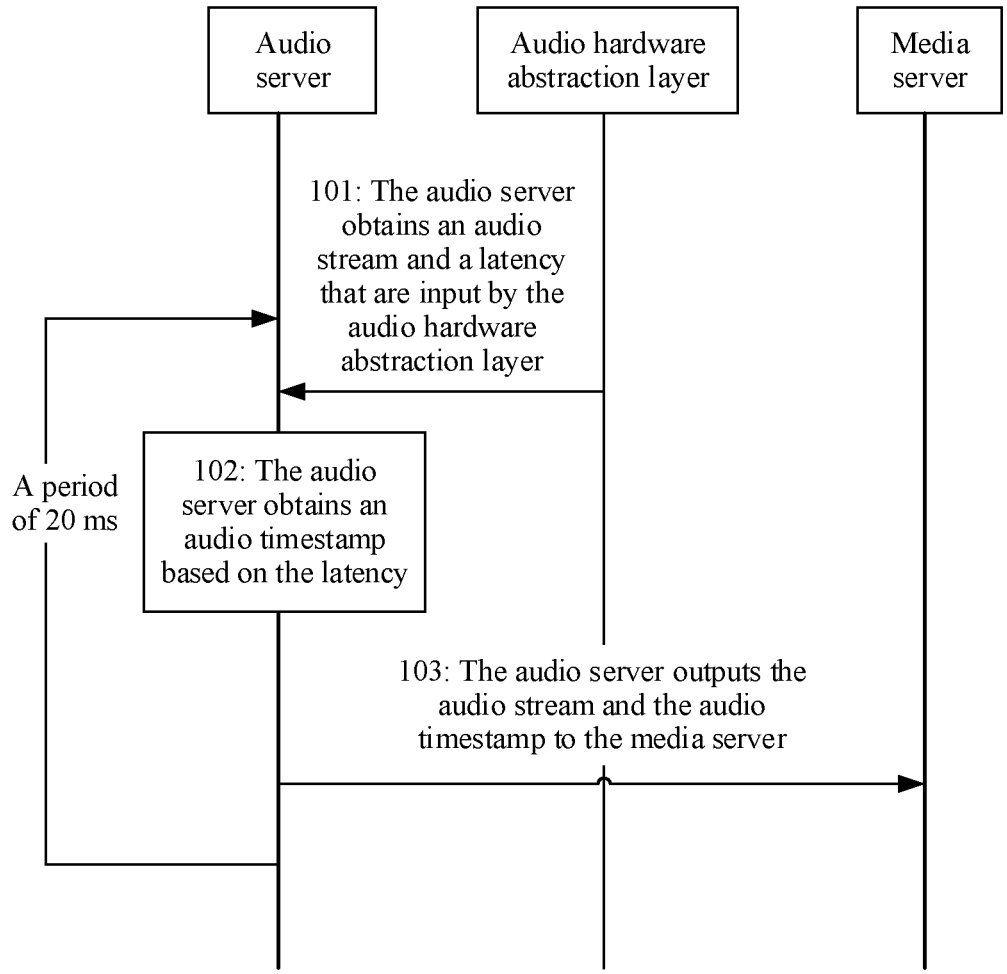
FIG. 9 is a schematic flowchart of a video processing method according to an embodiment of this disclosure.
FIG. 10A is an example of a schematic diagram of comparison of audio timestamps in a scenario in which a zoom ratio increases.
FIG. 10B is an example of a schematic diagram of comparison of audio timestamps in a scenario in which a zoom ratio increases.

FIG. 9 is a schematic diagram of interaction between the audio HAL, the audio server, and the media server. It should be noted that, in related descriptions in FIG. 9, an instance in each module is used as a main body for description. In FIG. 9, the following steps are included.

S101: The audio server obtains an audio stream and a latency that are input by the audio HAL.

The record thread instance of the audio server periodically reads the audio stream and the latency from the input stream instance of the audio HAL. In this disclosure, an example in which a reading period is 20 ms is used for description. In other words, a frame length of an audio frame is 20 ms (for a related concept, refer to the foregoing audio timestamp calculation method). In another embodiment, a period length and an audio frame length may alternatively be other values. This is not limited in this disclosure.

In an example, the latency may include only a sound propagation latency. In another example, the latency may include the sound propagation latency and an algorithm processing latency.

In a possible implementation, if the audio HAL detects that a zoom ratio is greater than a specified zoom ratio, for example, 2×, the audio HAL triggers a recording directional algorithm. To be specific, a recording directional algorithm instance processes the audio stream based on the recording directional algorithm. Correspondingly, the algorithm processing latency is introduced in the processing process, and the latency input by the audio HAL to the audio server includes the algorithm processing latency and the sound propagation latency. If the audio HAL detects that a zoom ratio is less than or equal to the specified zoom ratio, the audio HAL does not trigger the recording directional algorithm. In other words, there is no algorithm processing latency, and the latency input by the audio HAL to the audio server includes the sound propagation latency.

S102: The audio server obtains an audio timestamp based on the latency.

For example, the record thread instance of the audio server may obtain the audio timestamp (in a unit of ms) based on the following formula:

$$\text{the audio timestamp} = N \times l \text{ the latency} \qquad (3)$$

Herein, N is a quantity of reading times, namely, an $N^{th}$ reading period, l is the audio frame length (in a unit of ms), and the latency is the latency (in a unit of ms).

It should be noted that the audio timestamp is a result obtained after rounding up based on a multiple of the audio frame duration (for example, 20 ms). In other words, a result calculated by the record thread instance based on the formula (3) needs to be rounded up to the multiple of 20 ms. For example, if the result calculated based on the formula (3) is 38 ms, the audio timestamp obtained after rounding up to the multiple of 20 ms is 40 ms.

It can be learned with reference to the formula (1) and the formula (3) that, in this disclosure, the audio timestamp is corrected by subtracting the latency from the audio timestamp.

S103: The audio server outputs the audio stream and the audio timestamp to the media server.

Still refer to FIG. 9. After obtaining the audio timestamp, the record thread instance of the audio server outputs the audio stream and the corresponding audio timestamp to the media server (specifically, the audio record instance).

In a recording process, the audio server (specifically, the record thread instance) periodically (for example, in a period of 20 ms) performs S101 to S103. To be specific, the record thread instance reads an audio stream every 20 ms, obtains an audio timestamp corresponding to the audio stream, and outputs the audio timestamp to the audio record instance.

Refer to FIG. 8. The audio server outputs the audio timestamp and the audio stream to the media server, and processes the audio stream and the timestamp through each instance in the media server (for a process, refer to the related descriptions in FIG. 4, and details are not described herein), to generate an MP4 file. For a correspondence between a video timestamp and an audio timestamp in the MP4 file, refer to FIG. 4.

In a possible implementation, latency calculation may alternatively be performed by the audio server, for example, the record thread instance. For example, the audio server may periodically read audio and a current zoom ratio from the audio HAL, and calculate a sound propagation latency based on the current zoom ratio. In addition, the audio server may calculate a corrected audio timestamp based on the foregoing audio timestamp calculation formula. In another embodiment, the corrected audio timestamp may alternatively be calculated by the audio HAL or the media server. A specific method is similar to that of the audio server, and details are not described herein.

Embodiment 2

The solution described in Embodiment 1 is performed when the zoom ratio X remains unchanged. Actually, in a photographing process, the camera application may control zoom ratio conversion in response to a user operation behavior. However, an audio timestamp processed based on the audio timestamp correction solution in this disclosure may cause an audio timestamp jitter problem due to frequent zoom ratio conversion. Consequently, audio is discontinuous. The solution described in Embodiment 2 may be used in this disclosure, to effectively resolve the audio timestamp jitter problem caused by the zoom ratio conversion.

Before the audio timestamp correction scheme is introduced, reasons for an audio timestamp jitter are introduced first.

In a recording process, the camera application may adjust a zoom ratio based on a user operation behavior. It is assumed that an adjusted zoom ratio is Y.

In an example, if the zoom ratio Y is greater than the zoom ratio X, that is, the zoom ratio increases, or in other words, a photographing distance (or referred to as an imaging distance) increases, a current audio timestamp may be less than or equal to a previous audio timestamp. Specific reasons are as follows:

$$N \times l - \frac{d2}{c \times 1000} - p \le (N-1) \times l - \frac{d1}{c \times 1000} - p \qquad (4)$$

Herein, d2 is an imaging distance (in a unit of meter) corresponding to the zoom ratio Y, d1 is an imaging distance (in a unit of meter) corresponding to the zoom ratio X, N is a current quantity of reading times (which may also be understood as a current reading period), (N−1) is a previous quantity of reading times (namely, a previous reading period), and p is an algorithm processing latency. It can be learned that an increase of the imaging distance causes an increase of a sound transmission distance, that is, d2 is greater than d1. Correspondingly, a sound propagation latency is increased. As described above, a latency is a sum of the sound propagation latency and the algorithm processing latency. In other words, a difference between a current latency (which is set to the latency 2) and a latency of the previous period (which is set to the latency 1) is greater than or equal to an audio frame length. This is represented as: the latency 2−the latency 1≥the audio frame length (20 ms). Correspondingly, an audio timestamp (denoted as a recording audio timestamp 2) corresponding to an audio frame read in the current period is less than or equal to an audio timestamp (denoted as a recording audio timestamp 1) corresponding to an audio frame read in the previous period. This is represented as: the recording audio timestamp 2−the recording audio timestamp 1≤0 ms. It should be noted that, the recording audio timestamp 1 and the recording audio timestamp 2 are merely examples for better indicating a relationship between recording audio timestamps. A number of the audio timestamp is not limited in this disclosure. As shown in FIG. 10A, expected audio timestamps, or audio timestamps written into an MP4 file (referred to as written audio timestamps for short) need to be: 0 ms, 20 ms, 40 ms, 60 ms, and 80 ms (the audio timestamps corresponding to the four audio streams are merely used as an example for description in the figure). In other words, a correct audio timestamp needs to be the written audio timestamp in FIG. 10A. To distinguish from the written audio timestamp, an audio timestamp before correction is referred to as a recording audio timestamp. For example, FIG. 10A shows a comparison between the written audio timestamp and the recording audio timestamp. For example, when an audio timestamp originally needs to be 40 ms (in other words, the written audio timestamp is 40 ms), a recording audio timestamp (namely, the recording audio timestamp 2) is 20 ms due to an increase of the zoom ratio. In other words, the recording audio timestamp is equal to the recording audio timestamp of the previous period (namely, the recording audio timestamp 1). This may be represented as: the recording audio timestamp 2—the recording audio timestamp 1=0. In addition, when an audio timestamp originally needs to be 60 ms, a recording audio timestamp obtained after processing is 40 ms; and when a recording audio timestamp originally needs to be 80 ms, a processed recording audio timestamp obtained after processing is 60 ms. In other words, starting from a zoom ratio change moment, each subsequent recording audio timestamp is 20 ms different from an expected or correct written audio timestamp. It may also be understood that, if the audio frame corresponding to the recording audio timestamp shown in FIG. 10A is played, audio played at the 40$^{th}$ ms is audio collected at the 20$^{th}$ ms.

In another example, if the zoom ratio Y is less than the zoom ratio X, that is, the zoom ratio is enlarged, or in other words, an imaging distance increases, an interval between a current recording audio timestamp and a previous recording audio timestamp may be greater than or equal to 40 ms. Specific reasons are as follows:

$$N \times l - \frac{d2}{c \times 1000} - p \geq (N-1) \times l - \frac{d1}{c \times 1000} - p \quad (5)$$

According to the formula, a difference between a latency (which is set to the latency 1) of a previous period and a current latency (which is set to the latency 2) is greater than or equal to an audio frame length. This is represented as: the latency 1–the latency 2≥the audio frame length (20 ms). Correspondingly, the interval between the current recording audio timestamp and the previous recording audio timestamp is greater than or equal to 40 ms (that is, twice the audio frame length, or may be represented as twice reading period duration). This is represented as: the recording audio timestamp 2–the recording audio timestamp 1≥40 ms. As shown in FIG. 11A, for example, an audio timestamp originally needs to be 40 ms, and the latency is decreased due to a decrease of the zoom ratio. Consequently, a recording audio timestamp obtained after processing is 60 ms. This may be represented as: the recording audio timestamp 2–the recording audio timestamp 1=40 ms. In addition, when an audio timestamp originally needs to be 60 ms, a recording audio timestamp obtained after processing is 80 ms. In other words, starting from a zoom ratio change moment, each subsequent recording audio timestamp is 20 ms different from an expected or correct written audio timestamp. It may also be understood that, if an audio frame corresponding to the recording audio timestamp shown in FIG. 11A is played, audio played at the 40$^{th}$ ms is audio collected at the 60$^{th}$ ms.

As described above, when the audio timestamp is calculated, the audio timestamp is rounded up to 20 ms. In other words, the audio timestamp is a multiple of 20 ms. If the latency 2 is greater than the latency 1 and the difference between the latency 1 and latency 2 is less than the audio frame length (20 ms), or the latency 1 is greater than the latency 2 and the difference between the latency 1 and the latency 2 is less than the audio frame length, the calculated audio timestamp does not have a jitter problem. For example, based on a sound propagation formula, a transmission distance of a sound within 20 ms is about 6.8 m. In other words, when a zoom ratio change causes an increase or decrease of a photographing distance by 6.8 m or more, an audio timestamp jitter problem exists.

Figure 12A:
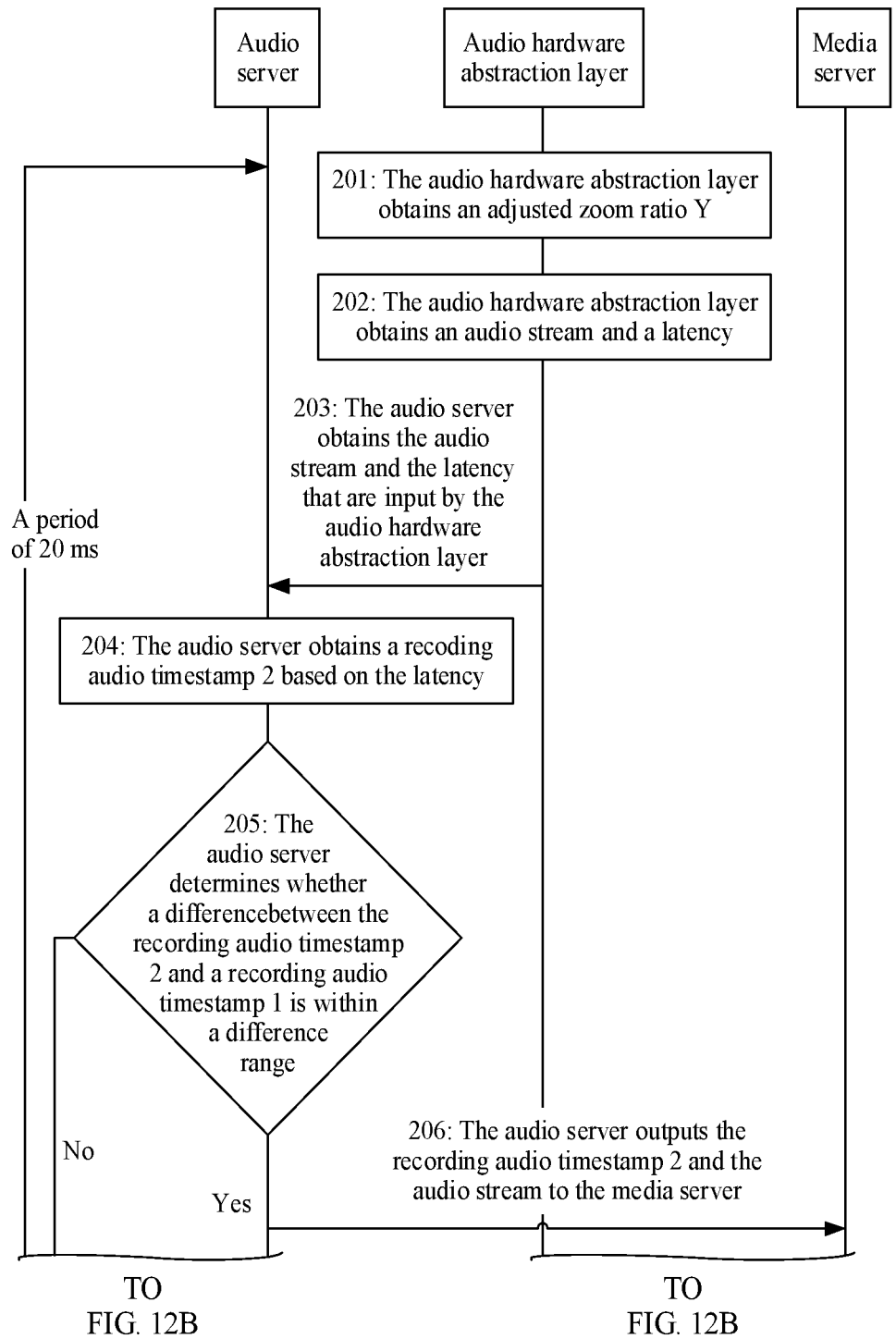
FIG. 12A and FIG. 12B are a schematic flowchart of a video processing method according to an embodiment of this disclosure.
Figure 12B:
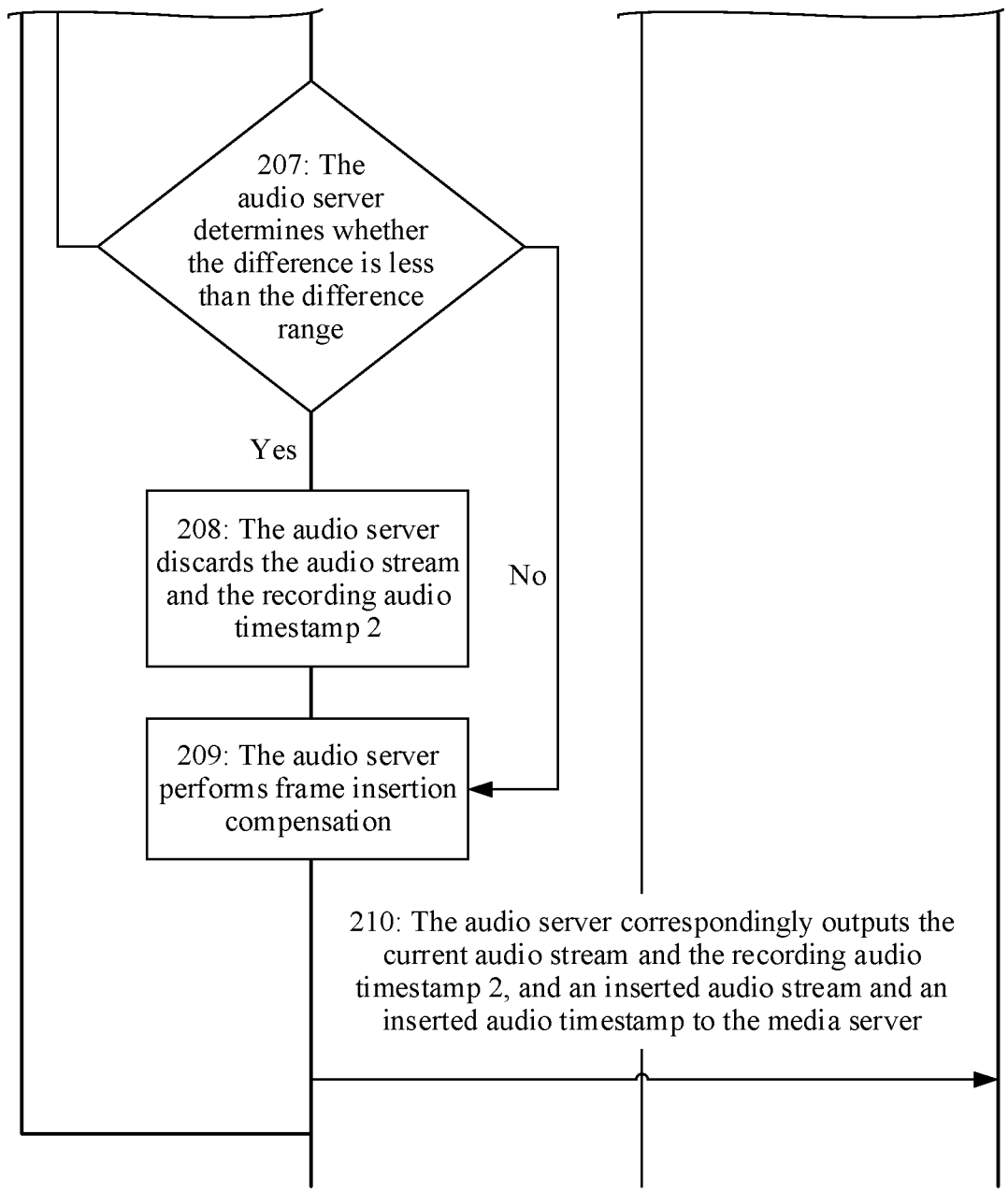

With reference to FIG. 12A and FIG. 12B, the following describes in detail the audio timestamp correction manner in Embodiment 2. In FIG. 12A and FIG. 12B, the following steps are included.

S201: The audio HAL obtains an adjusted zoom ratio Y.

In a recording process, the camera application may determine, in response to a detected user operation behavior, a zoom ratio for current photographing, where the adjusted zoom ratio Y may be greater than the zoom ratio X or less than the zoom ratio X. With reference to FIG. 6, the camera application may output the adjusted zoom ratio Y to the audio HAL (specifically, the input stream instance).

S202: The audio HAL obtains an audio stream and a latency.

For example, the audio HAL (specifically, the input stream instance) may obtain a sound propagation latency based on the zoom ratio Y, and determine that the latency is a sum of the sound propagation latency (ms) and an algorithm processing latency. For a specific obtaining manner, refer to Embodiment 1. Details are not described herein again.

It should be noted that, unless otherwise specified, for other details that are not shown in this embodiment in FIG. 12A and FIG. 12B, refer to related descriptions in FIG. 8 and FIG. 9. Details are not described in this embodiment again.

S203: The audio server obtains the audio stream and the latency that are input by the audio HAL.

For example, as described above, the audio server (specifically, the record thread instance) periodically (for example, 20 ms) reads the audio stream and the latency from the audio HAL (specifically, the input stream). In the procedure shown in FIG. 12A and FIG. 12B, only a current reading period is used as an example for description. In other words, in each reading period, the audio HAL performs related steps in FIG. 12A and FIG. 12B.

For example, in this embodiment, an example in which a latency corresponding to the zoom ratio before adjustment is a latency 1 and a latency corresponding to the zoom ratio after adjustment is a latency 2 is used for description. In other words, the record thread instance obtains the audio stream and the latency 2 from the input stream instance.

S204: The audio server obtains a recording audio timestamp 2 based on the latency.

For a manner of calculating the recording audio timestamp 2, refer to the description in S102, and details are not described herein again.

S205: The audio server determines whether a difference between the recording audio timestamp 2 and a recording audio timestamp 1 is within a difference range.

The difference range is greater than 0 and less than twice reading period duration, and is represented as (0, 2l), where l is the reading period duration (namely, an audio frame length).

In an example, the difference between the recording audio timestamp 2 and the recording audio timestamp 1 is greater than 0 and less than 2l, for example, 0 ms<the recording audio timestamp 2–the recording audio timestamp 1<40 ms. In other words, a latency difference between a latency of the current period and a latency of a previous period is less than 20 ms, including: the latency 2–the latency 1<20 ms, and the latency 1–the latency 2<20 ms. In other words, when the zoom ratio remains unchanged or the zoom ratio changes slightly, the audio server (specifically, the record thread instance) determines that the difference between the recording audio timestamp 2 and the recording audio timestamp 1 is within the difference range, and performs step 206.

In another example, if the difference between the recording audio timestamp 2 and the recording audio timestamp 1 is not within the difference range, that is, the recording audio timestamp 2−the recording audio timestamp 1≤0 ms, or the recording audio timestamp 2−the recording audio timestamp 1≥40 ms, S207 is performed.

S206: The audio server outputs the recording audio timestamp 2 and the audio stream to the media server.

For example, if the audio server (specifically, the record thread instance) determines that the difference between the two recording audio timestamps is within the difference range in S205, the recording audio timestamp 2 and a corresponding audio stream are input to the media server, and the media server may write the recording audio timestamp 2 and the audio frame into an MP4 file. Optionally, after being written into the MP4 file, the recording audio timestamp may also be referred to as a written audio timestamp.

S207: The audio server determines whether the difference is less than the difference range.

In an example, the recording audio timestamp 2−the recording audio timestamp 1≤0 ms, that is, the difference between the recording audio timestamp 2 and the recording audio timestamp 1 is less than the difference range. In other words, the latency (the latency 2) corresponding to the current period is greater than the latency corresponding to the previous period, and the difference between the two latencies is greater than or equal to the audio frame length (20 ms), that is, the latency 2−the latency 1≥20 ms. In other words, in a scenario in which the zoom ratio increases, step 208 is performed.

In another example, the recording audio timestamp 2−the recording audio timestamp 1≥40 ms, that is, the difference between the recording audio timestamp 2 and the recording audio timestamp 1 is greater than the difference range. In other words, the latency (the latency 2) corresponding to the current period is less than the latency corresponding to the previous period, and the difference between the two latencies is greater than or equal to the audio frame length (20 ms), that is, the latency 1−the latency 2≥20 ms. In other words, in a scenario in which the zoom ratio decreases, step 209 is performed.

S208: The audio server discards the audio stream and the recording audio timestamp 2.

As shown in FIG. 12A and FIG. 12B, for example, the audio server (specifically, the record thread instance) periodically reads the audio stream and the latency from the audio HAL (specifically, the input stream instance), and obtains the corresponding recording audio timestamp. If it is determined in step 205 that the recording audio timestamp 2−the recording audio timestamp 1≤0 ms, the record thread instance discards the audio timestamp (namely, the recording audio timestamp 2) and the corresponding audio frame, that is, skips the audio frame, and outputs an audio frame and an audio timestamp in a next period to the media server (specifically, the audio record instance). Audio timestamps after jitter processing (or referred to as correction processing, calibration processing, and the like) are shown in FIG. 10B. As shown in FIG. 10B, the record thread instance discards a second repeated audio timestamp of 20 ms (namely, the recording audio timestamp 2) and the audio stream corresponding to the audio timestamp. In this case, audio timestamps (namely, the audio timestamps after processing in FIG. 10B) corresponding to audio streams written into the MP4 file are sequentially 0 ms, 20 ms, 40 ms, and 60 ms.

For example, with reference to a sound propagation speed, a propagation distance of the sound every 20 ms is 6.8 m, and calculation is performed by using 6.8 m as a gradient. To be specific, after zoom ratio conversion, a sound latency increases by 20 ms each time a pickup distance of the sound increases by 6.8 m. Correspondingly, an audio frame in a period and a timestamp of the audio frame are discarded each time the sound latency increases by 20 ms.

After discarding the audio frame and the audio timestamp of the audio frame, the audio server repeats S201 and subsequent steps in a next period.

S209: The audio server performs frame insertion compensation.

It can be learned from FIG. 11A that, because the zoom ratio decreases, an audio timestamp of a current audio frame and a timestamp of a previous audio frame are greater than or equal to 40 ms, that is, the recording audio timestamp 2−the recording audio timestamp 1≥40 ms. In this disclosure, the audio server (specifically, the record thread) may perform frame insertion compensation between the current audio frame and the previous audio frame, to prevent an audio jitter. As shown in FIG. 12A and FIG. 12B, the record thread indicates the audio HAL to calculate an audio timestamp of an inserted frame, and the audio timestamp of the inserted audio frame (referred to as an inserted audio timestamp for short) is:

$$\text{the insert audio timestamp} = N \times l - \frac{d1 + d2}{2 \times c \times 1000} - p \qquad (6)$$

Meanings of the parameters are consistent with those described above. Details are not described herein again. To be specific, the audio HAL calculates the audio timestamp based on an intermediate value of an imaging distance corresponding to the zoom ratio Y and the zoom ratio X. The audio server reads, twice in the current period, the audio frame and the audio timestamp (namely, the inserted audio timestamp) output by the audio HAL, and inserts the audio timestamp between two audio timestamps with an interval of 40 ms, as shown in FIG. 11B. Refer to FIG. 11B. Audio timestamps corresponding to audio in the MP4 file are sequentially 0 ms, 20 ms, 40 ms (namely, the inserted audio timestamp), and 60 ms.

For example, the audio frame corresponding to the inserted audio timestamp may be a result obtained after fade-in and fade-out is performed on the previous audio frame.

S210: The audio server correspondingly outputs the current audio stream and the recording audio timestamp 2, and the inserted audio stream and the inserted audio timestamp to the media server.

Still refer to FIG. 12A and FIG. 12B. The audio server outputs the audio streams and the corresponding audio timestamps that are read in two times, namely, the newly inserted audio timestamp and the corresponding audio stream, and the current audio timestamp (namely, the recording audio timestamp 2) and the corresponding audio stream to the media server (specifically, the audio record instance). The media server may write the newly inserted audio timestamp and the corresponding audio frame, and the current audio timestamp and the corresponding audio frame into the MP4 file, and perform S201 and subsequent steps in a next period again.

Figure 13A:
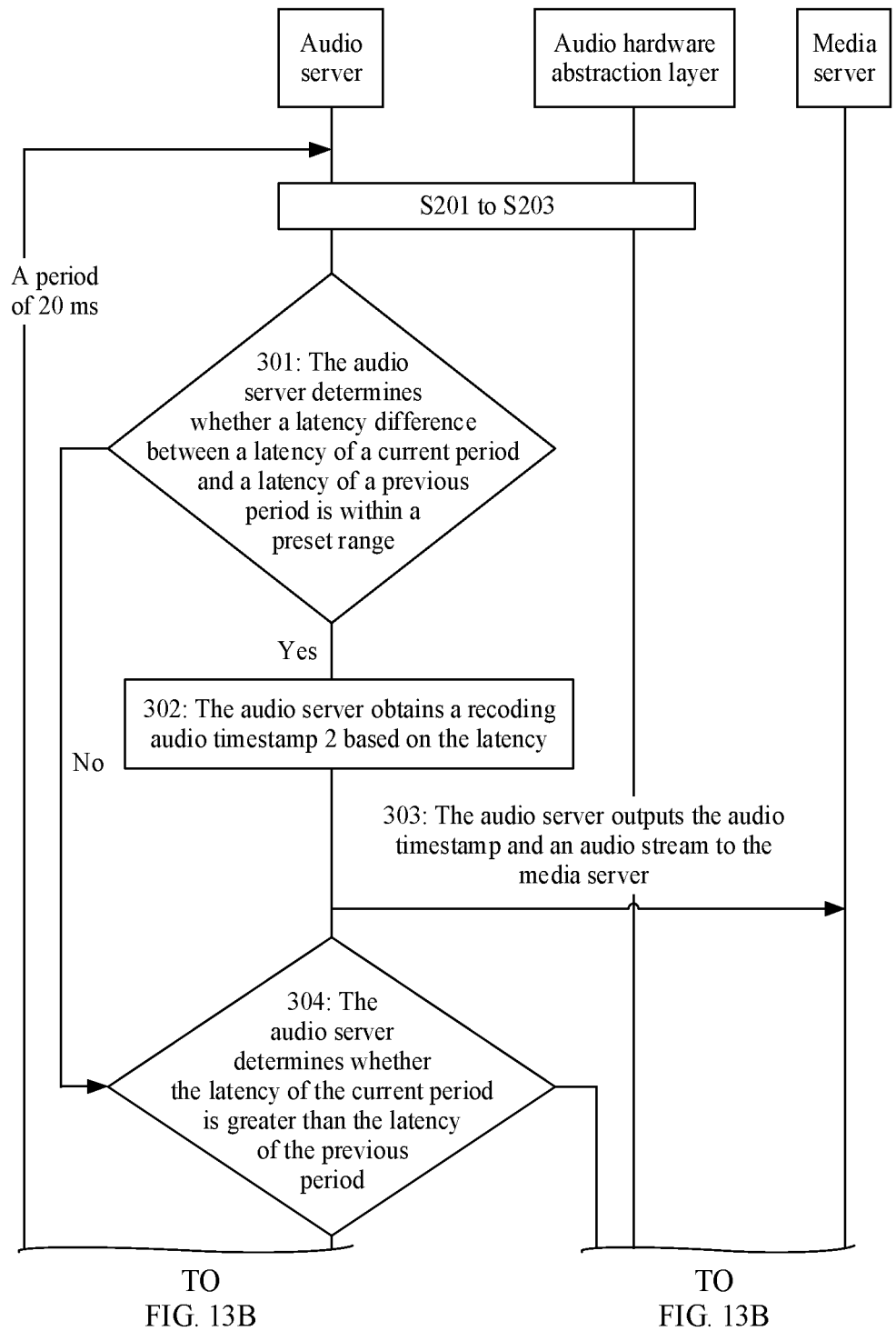
FIG. 13A and FIG. 13B are a schematic flowchart of a video processing method according to an embodiment of this disclosure.
Figure 13B:
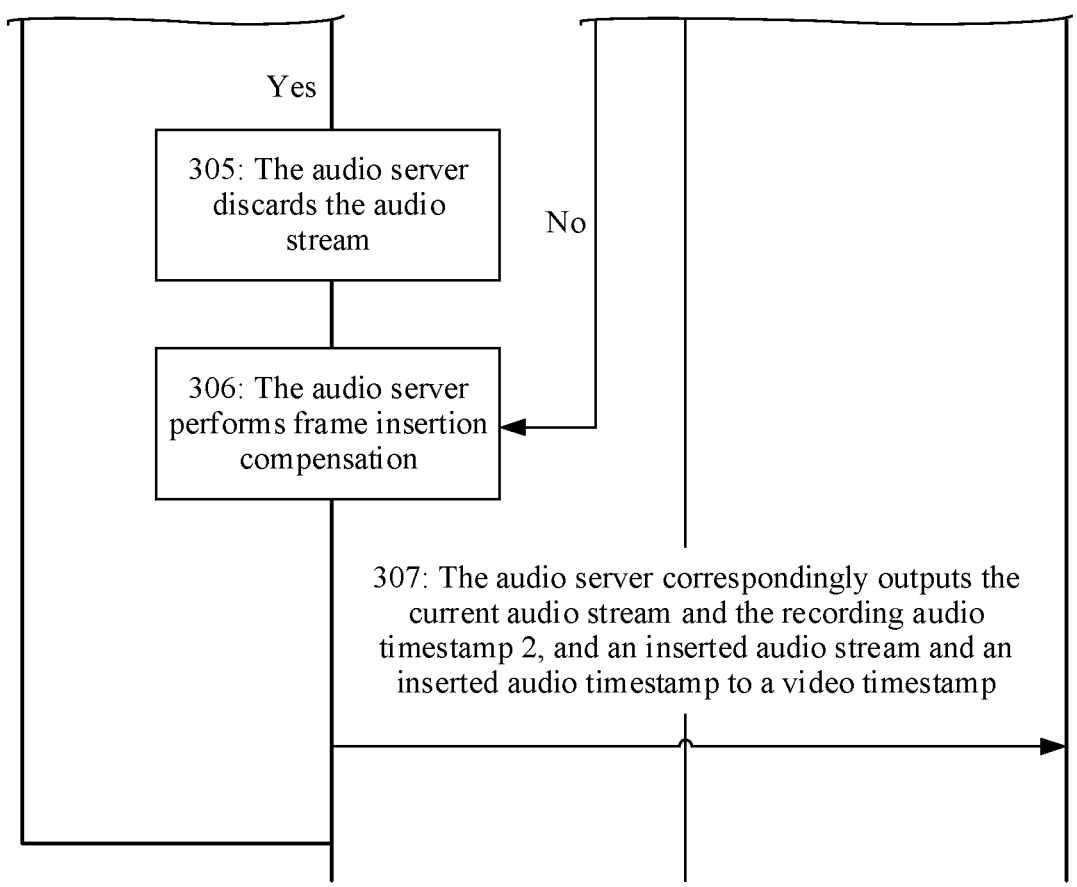

It should be noted that S204 to S209 in FIG. 12A and FIG. 12B are all performed based on a determining result of the difference between the recording audio timestamp 2 and the recording audio timestamp 1. In a possible implementation, the audio server may determine a subsequent processing manner based on an obtained latency difference between a latency of a current period and a latency of a previous period. FIG. 13A and FIG. 13B show another processing manner after S203. In FIG. 13A and FIG. 13B, the following steps are included.

S301: The audio server determines whether the latency difference between the latency of the current period and the latency of the previous period is within a preset range.

In an example, the latency (the latency 2) corresponding to the current period is greater than the latency corresponding to the previous period, and the difference between the two latencies is greater than or equal to an audio frame length (20 ms), that is, the latency 2–the latency 1≥20 ms. In other words, when the zoom ratio increases, the audio server (specifically, the record thread instance) determines that the latency difference between the latency of the current period and the latency of the previous period is not within the preset range, and performs S304.

In another example, the latency (the latency 2) corresponding to the current period is less than the latency corresponding to the previous period, and the difference between the two latencies is greater than or equal to an audio frame length (20 ms), that is, the latency 1–the latency 2≥20 ms. In other words, when the zoom ratio decreases, the audio server (specifically, the record thread instance) determines that the latency difference between the latency of the current period and the latency of the previous period is not within the preset range, and performs S304.

In another example, the latency difference between the latency of the current period and the latency of the previous period is less than 20 ms, including: the latency 2–the latency 1<20 ms, and the latency 1–the latency 2<20 ms. In other words, when the zoom ratio remains unchanged, or the zoom ratio changes slightly, the audio server (specifically, the record thread instance) determines that the latency difference between the latency of the current period and the latency of the previous period is within the preset range, and performs S302.

S302: The audio server obtains a recording audio timestamp 2 based on the latency.

S303: The audio server outputs the recording audio timestamp 2 and the audio stream to the media server.

For example, if the audio server (specifically, the record thread instance) determines that the time difference between the two latencies is within the preset range in S301, the audio server obtains the corresponding recording audio timestamp 2, and inputs the audio timestamp and the audio stream to the media server. The media server may write the audio timestamp and the audio frame into an MP4 file.

S304: The audio server determines whether the latency of the current period is greater than the latency of the previous period.

For example, when the latency difference between the latency of the current period and the latency of the previous period is not within the preset range, if the latency (the latency 2) corresponding to the current period is greater than the latency corresponding to the previous period, S305 is performed, or if the latency (the latency 2) corresponding to the current period is less than the latency corresponding to the previous period, S306 is performed.

S305: The audio server discards the audio stream.

S306: The audio server performs frame insertion compensation.

S307: The audio server correspondingly outputs the current audio stream and the recording audio timestamp 2, and an inserted audio stream and an inserted audio timestamp to the media server.

Specific content of S305 to S307 is respectively the same as content of S207 to S209, and details are not described herein again.

In conclusion, in this embodiment of this disclosure, the electronic device may adjust the audio timestamp based on the current zoom ratio, to cancel a latency caused by a distance between the electronic device and a sound source when the sound is collected in a directional manner. In addition, the electronic device may further dynamically adjust the audio timestamp based on a zoom ratio change, to suppress a timestamp jitter caused by the zoom ratio change, so as to provide a video processing manner. In this way, an audio latency can be effectively corrected, to implement audio and image synchronization.

It may be understood that, to implement the foregoing functions, the electronic device includes corresponding hardware and/or software modules for performing the functions. With reference to algorithm steps of each example described in embodiments disclosed in this specification, this disclosure can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this disclosure.

Figure 14:
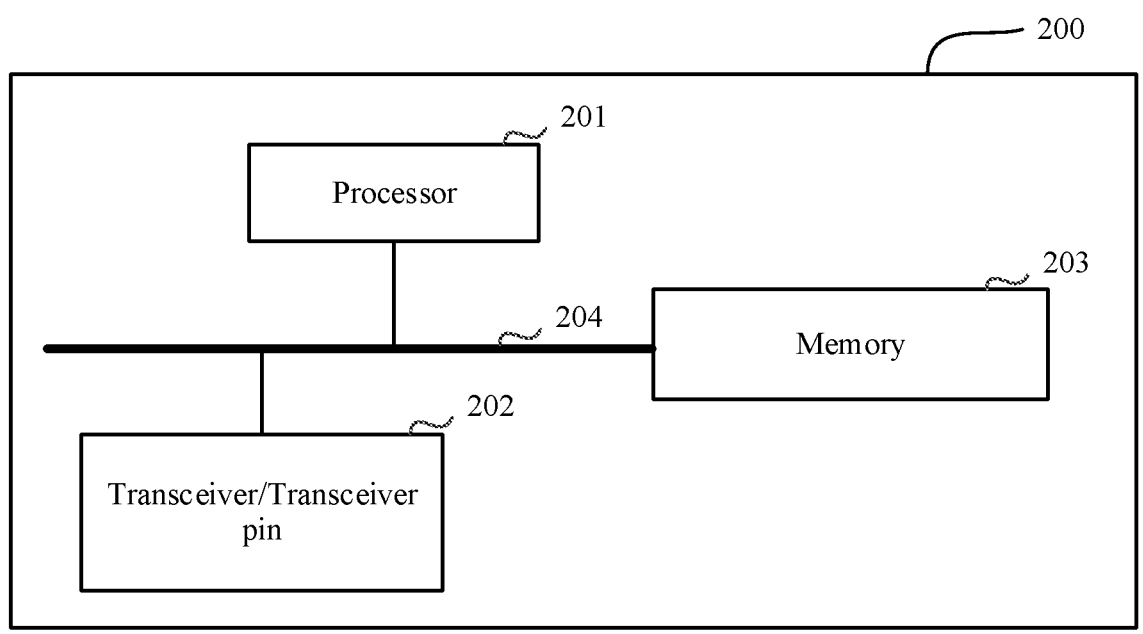
FIG. 14 is a schematic diagram of a structure of an apparatus according to an embodiment of this disclosure.

In an example, FIG. 14 is a schematic block diagram of an apparatus 200 according to an embodiment of this disclosure. The apparatus 200 may include a processor 201 and a transceiver/transceiver pin 202, and optionally, further include a memory 203.

Components of the apparatus 200 are coupled together through a bus 204. In addition to a data bus, the bus 204 further includes a power bus, a control bus, and a status signal bus. However, for clear description, various types of buses in the figure are referred to as the bus 204.

Optionally, the memory 203 may be configured to store instructions in the foregoing method embodiments. The processor 201 may be configured to: execute the instructions in the memory 203, control a receive pin to receive a signal, and control a transmit pin to send a signal.

The apparatus 200 may be the electronic device or the chip of the electronic device in the foregoing method embodiments.

All related content of the steps in the foregoing method embodiments may be cited in function descriptions of corresponding function modules. Details are not described herein again.

An embodiment further provides a computer storage medium. The computer storage medium stores computer instructions. When the computer instructions are run on an electronic device, the electronic device is enabled to perform the related method steps, to implement the video processing method in the foregoing embodiments.

An embodiment further provides a computer program product. When the computer program product runs on a computer, the computer is enabled to perform the foregoing related steps, to implement the video processing method in the foregoing embodiments.

In addition, an embodiment of this disclosure further provides an apparatus. The apparatus may be a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the video processing method in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for convenient and brief description, division of the foregoing function modules is taken as an example for illustration. In actual application, the foregoing functions can be allocated to different modules and implemented based on a requirement, that is, an inner structure of an apparatus is divided into different function modules to implement all or some of the functions described above.

In the several embodiments provided in this disclosure, it should be understood that the disclosed apparatuses and methods may be implemented in another manner. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may be one or more physical units, may be located in one place, or may be distributed on different places. Some or all of the units may be selected based on an actual requirement to achieve objectives of the solutions of embodiments.

In addition, function units in embodiments of this disclosure may be integrated into one processing unit, or each of the units may exist alone physically, or two or more units may be integrated into one unit. The integrated unit may be implemented in a form of hardware, or may be implemented in a form of a software function unit.

In this disclosure, any content of the embodiments and any content of a same embodiment may be freely combined. Any combination of the foregoing content shall fall within the scope of this disclosure.

When the integrated unit is implemented in the form of the software function unit and sold or used as an independent product, the integrated unit may be stored in a readable storage medium. Based on such an understanding, the technical solutions in embodiments of this disclosure essentially, or the part contributing to other technologies, or all or some of the technical solutions may be implemented in a form of a software product. The software product is stored in a storage medium and includes several instructions for instructing a device (which may be a single-chip microcomputer, a chip or the like) or a processor to perform all or some of the steps of the methods described in embodiments of this disclosure. The storage medium includes: any medium that can store program code, such as a USB flash drive, a removable hard disk, a read-only memory (ROM), a random-access memory (RAM), a magnetic disk, or an optical disc.

The foregoing describes embodiments of this disclosure with reference to the accompanying drawings. However, this disclosure is not limited to the foregoing specific implementations. The foregoing specific implementations are merely examples, but are not limitative. Inspired by this disclosure, a person of ordinary skill in the art may further make many modifications without departing from the purposes of this disclosure and the protection scope of the claims, and all the modifications shall fall within the protection scope of this disclosure.

What is claimed is:

1. A video processing method, comprising:
   detecting a first instruction of a user;
   displaying, in response to the first instruction, a photographing interface;
   obtaining a first zoom ratio;
   obtaining a first video corresponding to the first zoom ratio, wherein the first video comprises first audio and a first image, wherein the first audio corresponds to the first image, wherein the first image comprises a first photographed object, wherein the first audio is from a first sound emitted by a first sound source, and wherein the first sound source is the first photographed object or a first object having a first distance from the first photographed object that is within a specified range;
   obtaining a first latency corresponding to the first audio, wherein the first latency comprises a first sound propagation latency or comprises both the first sound propagation latency and a specified algorithm processing latency, and wherein the first sound propagation latency is from the first sound being transmitted from the first sound source to an electronic device;
   determining, based on the first latency, a first audio timestamp of the first audio;
   displaying the first image on the photographing interface; and
   storing the first image and a first correspondence between the first audio and the first audio timestamp.

2. The video processing method of claim 1, wherein after storing the first image and the first correspondence, the video processing method further comprises synchronously playing, based on the first audio timestamp, the first audio and the first image.

3. The video processing method of claim 1, wherein obtaining the first latency comprises:
   obtaining, based on the first zoom ratio and a second correspondence between the first zoom ratio and a first imaging distance, the first imaging distance; and
   calculating the first sound propagation latency based on the following formula:

$$\text{the first sound propagation latency} = \frac{d1}{c},$$

wherein d1 is the first imaging distance,
wherein c is a propagation speed of the first sound in a photographing medium,
wherein determining the first audio timestamp comprises calculating the first audio timestamp based on the following formula:

$$\text{the first audio timestamp} = N1 \times l - \text{a latency 1},$$

wherein the latency 1 is the first latency, wherein l is a duration of a first reading period,
wherein the first reading period is of periodically reading, from a video recording start moment, audio from a collection point,
wherein N1 is the first reading period corresponding to the first audio, and
wherein N1 is an integer greater than or equal to 1.

4. The video processing method of claim 3, wherein after storing the first image and the first correspondence, the video processing method further comprises:
   detecting a second instruction of the user;
   obtaining, based on the second instruction, a second zoom ratio;
   obtaining a second video corresponding to the second zoom ratio, wherein the second video comprises second audio and a second image, wherein the second image comprises a second photographed object, wherein the second audio is from a second sound emitted by a second sound source, and wherein the second sound source is the second photographed object or a second object having a second distance from the second photographed object that is within the specified range;
   obtaining a second latency corresponding to the second audio, wherein the second latency comprises a second sound propagation latency or the second sound propagation latency and the specified algorithm processing latency, and wherein the second sound propagation latency is from the second sound being transmitted from the second sound source to the electronic device; and
   determining, based on the second latency, a second audio timestamp of the second audio.

5. The video processing method of claim 4, wherein obtaining the second latency comprises:
   obtaining, based on the second zoom ratio and a third correspondence between the second zoom ratio and a second imaging distance, the second imaging distance; and
   calculating the second sound propagation latency based on the following formula:

$$\text{the second sound propagation latency} = \frac{d2}{c},$$

and
   wherein d2 is the second imaging distance.

6. The video processing method of claim 5, wherein determining the second audio timestamp comprises calculating the second audio timestamp based on the following formula:

the second audio timestamp=$N2 \times l$–a latency 2, wherein the latency 2 is the second latency,
   wherein N2 is a second reading period corresponding to the second audio,
   wherein N2 and N1 are adjacent periods, and
   wherein N2 is greater than N1.

7. The video processing method of according to claim 6, wherein after determining the second audio timestamp, the video processing second audio, the method further comprises:
   obtaining a difference between the second audio timestamp and the first audio timestamp based on the following formula:

the difference=the second audio timestamp–the first audio timestamp; and when the if the difference is greater than 0 and less than 2l:
      displaying the second image on the photographing interface; and
      storing the second image and a fourth correspondence between the second audio and the second audio timestamp.

8. The video processing method of claim 7, wherein when the difference is less than 0, the video processing method further comprises:
   displaying the second image on the photographing interface;
   storing the second image; and
   discarding the second audio and the second audio timestamp.

9. The video processing method of claim 8, wherein after storing the second image and discarding the second audio and the second audio timestamp, the video processing method further comprises synchronously playing, based on a third audio timestamp, third audio and the second image, wherein the third audio timestamp corresponds to the third audio, and wherein the third audio is from a next reading period of the second reading period.

10. The video processing method of claim 7, wherein when the difference is greater than or equal to 2l, the video processing method further comprises:
    displaying the second image; and
    storing the second image, the fourth correspondence, and a fifth correspondence between inserted audio and an inserted audio timestamp,
    wherein the inserted audio is based on the second audio,
    wherein the inserted audio timestamp is based on the following formula:

$$\text{the inserted audio timestamp} = N2 \times l - \frac{d1 + d2}{2c}, \text{ or}$$

$$\text{the inserted audio timestamp} = N2 \times l - \frac{d1 + d2}{2c} - p,$$

and
    wherein p is the specified algorithm processing latency.

11. The video processing method of according to claim 10, wherein after storing the second image, the fourth correspondence, and the fifth correspondence, the video processing method further comprises synchronously playing, based on the inserted audio timestamp, the inserted audio and the second image.

12. The video processing method of claim 1, wherein obtaining the first latency comprises obtaining, when the first zoom ratio is greater than a specified zoom ratio, the first latency.

13. The video processing method of claim 1, wherein obtaining the first zoom ratio comprises:
    reading a stored zoom ratio from a last time before previous video recording ends;
    detecting a zoom instruction of the user and obtaining, in response to the zoom instruction, the first zoom ratio; or
    detecting a mode setting instruction of the user, determining, in response to the mode setting instruction, a first zoom mode, and obtaining, based on a second correspondence between a zoom mode and a zoom ratio, the first zoom ratio.

14. An electronic device, comprising:
    a memory configured to store instructions; and a processor coupled to the memory and configured to execute the instructions to:
  detect a first instruction of a user;
  display, in response to the first instruction, a photographing interface;
  obtain a first zoom ratio;
  obtain a first video corresponding to the first zoom ratio, wherein the first video comprises first audio and a first image, wherein the first audio corresponds to the first image, wherein the first image comprises a first photographed object, wherein the first audio is from a first sound emitted by a first sound source, and wherein the first sound source is the first photographed object or a first object having a first object, or a distance from the first photographed object that is within a specified range;
  obtain a first latency corresponding to the first audio, wherein the first latency comprises a first sound propagation latency or comprises both the first sound propagation latency and a specified algorithm processing latency, and wherein the first sound propagation latency is from the first sound being transmitted from the first sound source to the electronic device;
  determine, based on the first latency, a first audio timestamp of the first audio;
  display the first image on the photographing interface; and
  store the first image and a first correspondence between the first audio and the first audio timestamp.

15. The electronic device of claim 14, wherein the processor is further configured to execute the instructions to synchronously play, based on the first audio timestamp, the first audio and the first image.

16. The electronic device of claim 14, wherein the processor is further configured to execute the instructions to:
  obtain, based on the first zoom ratio and a second correspondence between the first zoom ratio and a first imaging distance, the first imaging distance;
  calculate the first sound propagation latency based on the following formula:

$$\text{the first sound propagation latency} = \frac{d1}{c},$$

wherein d1 is the first imaging distance, and
  wherein c is a propagation speed of the first sound in a photographing medium; and
  calculate the first audio timestamp based on the following formula:

the first audio timestamp=$N1 \times l$−a latency 1, wherein the latency 1 is the first latency,
  wherein l is a duration of a first reading period,
  wherein the first reading period is of periodically reading, from a video recording start moment, audio from a collection point,
  wherein N1 is the first reading period corresponding to the first audio, and
  wherein N1 is an integer greater than or equal to 1.

17. The electronic device of claim 16, wherein the processor is further configured to execute the instructions to:
  detect a second instruction of the user;
  obtain, based on the second instruction, a second zoom ratio;
  obtain a second video corresponding to the second zoom ratio, wherein the second video comprises second audio and a second image, wherein the second image comprises a second photographed object, wherein the second audio is from a second sound emitted by a second sound source, and wherein the second sound source is the second photographed object or a second object having a second distance from the second photographed object that is within the specified range;
  obtaining a second latency corresponding to the second audio, wherein the second latency comprises a second sound propagation latency or the second sound propagation latency and the specified algorithm processing latency, and wherein the second sound propagation latency is from the second sound being transmitted from the second sound source to the electronic device; and
  determine, based on the second latency, a second audio timestamp of the second audio.

18. The electronic device of claim 17, wherein the processor is further configured to execute the instructions to:
  obtain, based on the second zoom ratio and a third correspondence between the second zoom ratio and a second imaging distance, the second obtaining a second imaging distance; and
  calculate the second sound propagation latency based on the following formula:

$$\text{the second sound propagation latency} = \frac{d2}{c},$$

and
  wherein d2 is the second imaging distance.

19. The electronic device of claim 18, wherein the processor is further configured to calculate the second audio timestamp based on the following formula:

the second audio timestamp=$N2 \times l$−the latency 2, wherein the latency 2 is the second latency,
  wherein N2 is a second reading period corresponding to the second audio,
  wherein N2 and N1 are adjacent periods, and
  wherein N2 is greater than N1.

20. A computer program product comprising instructions stored on a non-transitory computer-readable storage medium that, when executed by a processor, cause an electronic device to:
  detect a first instruction of a user;
  display, in response to the first instruction, a photographing interface;
  obtain a first zoom ratio;
  obtain a first video corresponding to the first zoom ratio, wherein the first video comprises first audio and a first image, wherein the first audio corresponds to the first image, wherein the first image comprises a first photographed object, wherein the first audio is from a first sound emitted by a first sound source, and wherein the first sound source is the first photographed object or a first object having a first distance from the first photographed object that is within a specified range;
  obtain a first latency corresponding to the first audio, wherein the first latency comprises a first sound propagation latency or comprises both the first sound propagation latency and a specified algorithm processing latency, and wherein the first sound propagation latency is from the first sound being transmitted from the first sound source to the electronic device;
determine, based on the first latency, a first audio timestamp of the first audio;
display the first image on the photographing interface; and
store the first image and a first correspondence between the first audio and the first audio timestamp.

* * * * *

UNITED STATES PATENT AND TRADEMARK OFFICE
CERTIFICATE OF CORRECTION

| | | |
|---|---|---|
| PATENT NO. | : 12,106,780 B2 | Page 1 of 1 |
| APPLICATION NO. | : 18/173904 | |
| DATED | : October 1, 2024 | |
| INVENTOR(S) | : Xuejiang Cai, Yanhui Yu and Li Cheng | |

It is certified that error appears in the above-identified patent and that said Letters Patent is hereby corrected as shown below:

In the Claims

Claim 7, Column 39, Line 59: "The video processing method of according to claim 6," should read "The video processing method of claim 6,"

Claim 7, Column 39, Line 61: "video processing second audio, the method further com-" should read "video processing method further com-"

Claim 7, Column 40, Line 1: "when the if the difference is greater than 0 and less than" should read "when the difference is greater than 0 and less than"

Claim 11, Column 40, Line 44: "The video processing method of according to claim" should read "The video processing method of claim"

Claim 14, Column 41, Line 14: "tographed object or a first object having a first object" should read "tographed object or a first object having a first"

Claim 14, Column 41, Line 15: "or a distance from the first photographed object that" should read "distance from the first photographed object that"

Claim 18, Column 42, Line 24: "second imaging distance, the second obtaining a second" should read "second imaging distance, the second"

Signed and Sealed this
Twelfth Day of November, 2024

Katherine Kelly Vidal
*Director of the United States Patent and Trademark Office*